US006231629B1

(12) United States Patent
Christianson et al.

(10) Patent No.: US 6,231,629 B1
(45) Date of Patent: *May 15, 2001

(54) ABRASIVE ARTICLE FOR PROVIDING A CLEAR SURFACE FINISH ON GLASS

(75) Inventors: Todd J. Christianson, Oakdale; David D. Nguyen, Shakopee; Robert G. Visser, Afton; Soon C. Park, Woodbury, all of MN (US)

(73) Assignee: 3M Innovative Properties Company, St. Paul, MN (US)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

This patent is subject to a terminal disclaimer.

(21) Appl. No.: 09/148,368

(22) Filed: Sep. 4, 1998

Related U.S. Application Data

(63) Continuation-in-part of application No. 08/813,878, filed on Mar. 7, 1997, now Pat. No. 5,910,471.

(51) Int. Cl.$^7$ .......................... B24D 11/00; B24D 11/02; B24D 17/00
(52) U.S. Cl. ............................. 51/295; 51/307; 51/308; 51/309; 45/529; 45/534
(58) Field of Search ..................... 51/295, 307, 309, 51/308; 451/529, 534

(56) References Cited

U.S. PATENT DOCUMENTS

| | | |
|---|---|---|
| 3,188,265 | 6/1965 | Charbonneau et al. ............. 161/188 |
| 3,246,430 | 4/1966 | Hurst ...................... 51/402 |
| 3,401,491 | 9/1968 | Schnabel et al. ...................... 51/295 |
| 3,594,865 | 7/1971 | Erb .............................. 18/5 |
| 3,713,796 | 1/1973 | Valerio et al. .......................... 51/298 |
| 3,991,527 | 11/1976 | Maran ...................... 51/295 |
| 3,997,527 | 12/1976 | McFarland et al. .............. 260/239.1 |
| 4,255,164 | 3/1981 | Butzke et al. ......................... 51/295 |
| 4,311,489 | 1/1982 | Kressner ................. 51/298 |
| 4,523,411 | 6/1985 | Freerks .......................... 51/170 MT |
| 4,529,410 | 7/1985 | Khalakji et al. ........................ 51/309 |
| 4,563,388 | 1/1986 | Bonk et al. ....................... 428/304.4 |
| 4,576,612 | 3/1986 | Shukla et al. ............................ 51/295 |
| 4,609,581 | 9/1986 | Ott ....................... 428/100 |
| 4,644,703 | 2/1987 | Kaczmarek et al. .................... 51/401 |
| 4,652,274 | 3/1987 | Boettcher et al. ..................... 51/298 |
| 4,652,275 | 3/1987 | Bloecher et al. ...................... 51/298 |
| 4,733,502 | 3/1988 | Braun ..................... 51/284 |
| 4,735,632 | 4/1988 | Oxman et al. ......................... 51/295 |
| 4,749,617 | 6/1988 | Canty .................. 428/332 |
| 4,751,138 | 6/1988 | Tumey et al. ....................... 428/323 |
| 4,773,920 | 9/1988 | Chasman et al. ...................... 51/295 |
| 4,799,939 | 1/1989 | Bloecher et al. ..................... 51/293 |
| 4,903,440 | 2/1990 | Larson et al. .......................... 51/298 |
| 4,906,523 | 3/1990 | Bilkadi et al. ........................ 428/327 |
| 4,933,234 | 6/1990 | Kobe et al. ........................... 428/336 |
| 4,959,265 | 9/1990 | Wood et al. ............................ 428/343 |
| 5,014,468 | 5/1991 | Ravipati et al. ........................ 51/295 |
| 5,015,266 | 5/1991 | Yamamoto ............................ 51/293 |
| 5,077,870 | 1/1992 | Melbye et al. ......................... 24/452 |
| 5,152,917 | 10/1992 | Pieper et al. ........................... 51/295 |
| 5,219,462 | 6/1993 | Bruxvoort et al. .................... 51/293 |
| 5,236,472 | 8/1993 | Kirk et al. .............................. 51/298 |
| 5,254,194 | 10/1993 | Ott et al. ............................... 156/175 |

(List continued on next page.)

FOREIGN PATENT DOCUMENTS

| | | |
|---|---|---|
| 0 291 100 A2 | 11/1988 | (EP) . |
| 0 345 239 A1 | 12/1989 | (EP) . |
| 0 400 658 A2 | 12/1990 | (EP) . |
| 0 655 297 A1 | 5/1995 | (EP) . |
| 650803 | 5/1995 | (EP) . |
| 2 330 502 | 6/1977 | (FR) . |
| 2 094 824 | 9/1982 | (GB) . |
| 63-185 579 | 8/1988 | (JP) . |
| 63-196363 | 8/1988 | (JP) . |
| 04201181 | 7/1992 | (JP) . |
| 6-071544 | 3/1994 | (JP) . |
| 07068469 | 3/1995 | (JP) . |
| WO 95/07797 | 3/1995 | (WO) . |
| WO 95/19242 | 7/1995 | (WO) . |
| WO 95/22436 | 8/1995 | (WO) . |
| WO 95/27595 | 10/1995 | (WO) . |
| WO 97/11484 | 3/1997 | (WO) . |
| WO/39142 | 9/1998 | (WO) .............................. B24D/3/28 |

OTHER PUBLICATIONS

Billmeyer, Jr., F.W., *Text Book of Polymer Science*, Third Edition, Title Page, Table of Contents, pp. v–xvii (1984) (no month).

Cook, L.M., "Chemical Processes in Glass Polishing", *J. Non–Crystalline Solids*, 120, 152–171 (1990) (no month).

Product Brochure for "Surtronic 3", Rank Taylor–Hobson, Leicester, England, 3 pages (undated).

T.R. McGibbon et al., "Surface Finish: A 3–Dimensional View", Brochure of 3M Industrial Abrasives Division, St. Paul, MN, pp. 1–5 (undated).

R. Jairath et al., "Role of Consumables in the Chemical Mechanical Polishing (CMP) of Silicon Oxide Films", 6 pages (undated).

*Primary Examiner*—Michael Marcheschi
(74) *Attorney, Agent, or Firm*—Daniel R. Pastirik

(57) ABSTRACT

An abrasive article is provided which comprises a backing; and at least one three-dimensional abrasive coating comprising diamond particles dispersed within a binder bonded to a surface of the backing, the binder comprising a cured binder precursor including a urethane acrylate oligomer. The abrasive article is capable of rapid glass stock removal coupled with reducing the surface finish as indicated by reduced Ra values using an RPP test procedure.

23 Claims, 2 Drawing Sheets

U.S. PATENT DOCUMENTS

| | | | |
|---|---|---|---|
| 5,256,170 | 10/1993 | Harmer et al. | 51/293 |
| 5,368,619 | 11/1994 | Culler | 51/308 |
| 5,435,816 | 7/1995 | Spurgeon et al. | 51/295 |
| 5,500,273 | 3/1996 | Holmes et al. | 428/147 |
| 5,505,747 | 4/1996 | Chesley et al. | 51/297 |
| 5,527,368 | 6/1996 | Supkis et al. | 51/298 |
| 5,551,960 | 9/1996 | Christianson | 51/295 |
| 5,580,647 | 12/1996 | Larson et al. | 428/245 |
| 5,707,409 * | 1/1998 | Martin et al. | 51/295 |
| 5,851,247 * | 12/1998 | Stoetzel et al. | 51/307 |
| 5,910,471 * | 6/1999 | Christianson et al. | 51/295 |

* cited by examiner

ABRASIVE ARTICLE FOR PROVIDING A CLEAR SURFACE FINISH ON GLASS

This is a continuation-in-part application of Application Ser. No. 08/813,878, filed on Mar. 7, 1997 U.S. Pat. No. 5,910,471.

BACKGROUND OF THE INVENTION

1. Field of the Invention

The present invention pertains to an abrasive article for polishing glass and a method of using the same.

2. Discussion of the Related Art

Glass articles are extensively found in homes, offices and factories in the form of lenses, prisms, mirrors, CRT screens, and other items. Many of these glass surfaces are used in optical components which require that the surface is optically clear and has no visible defects and/or imperfections. If present, defects, imperfections and even minute scratches can inhibit the optical clarity of the glass article. In some instances, these defects, imperfections and/or minute scratches can inhibit the ability to accurately see through the glass. Thus it is desired that the glass surface be essentially free of any defect, imperfection and/or scratch.

Many glass components are curved or contain a radius associated therewith.

These radii and curves are generally generated in the glass forming process. However, as a result of the glass forming process, defects such as mold lines, rough surfaces, small points and other small imperfections, can be present on the outer surface of the glass. These defects and/or imperfections, however small, tend to affect the optical clarity of the glass. Abrasive means have been widely used to remove such imperfections and/or defects. The abrasive means typically fall within three main categories: grinding, fining and polishing.

The grinding step further perfects the desired curve or radius and removes any casting defects by rough grinding the glass component with an abrasive tool. Typically this abrasive tool contains a superhard abrasive particle such as a diamond, tungsten carbide or cubic boron nitride. The resulting glass surface is usually of the approximate curvature required. However, the abrasive tool in this rough grinding process will impart coarse scratches into the glass surface such that resulting glass surface is neither precise enough nor smooth enough to directly polish to an optically clear state.

The second step is called "fining." The purpose of the fining step is to refine the coarse scratches generated by the rough grinding process. In general, the fining process will remove the deep scratches from rough grinding and provide a substantially smooth, although not polished surface. The fining process should also result in sufficient removal of the coarse scratches such that the glass surface can be polished to an optically clear surface. If the fining process does not remove all the coarse scratches, then it can be extremely difficult for the polishing step to remove these scratches to obtain an optically clear surface.

This fining process is typically done with a loose abrasive slurry. The loose abrasive slurry comprises a plurality of abrasive particles dispersed in a liquid medium such as water. The most common abrasive particles used for loose slurries are pumice, silicon carbide, aluminum oxide and the like. The loose abrasive slurry may optionally contain other additives such as dispersants, lubricants, defoamers and the like. In most instances, the loose abrasive slurry is pumped between the glass workpiece and a lap pad, such that the loose abrasive slurry is present between the glass workpiece and the lap pad. The lap pad can be made from any material such as rubber, foam, polymeric material, metal, steel and the like. Typically, both the glass workpiece and the lap pad will rotate relative to each other. This fining process typically comprises one or more steps, with each step generating a progressively finer and finer surface finish on the glass workpiece. A finer surface finish can be achieved by various means including utilizing a "softer" abrasive particle, a smaller abrasive particle, "softer" lap pad material and/or different machine conditions. The surface finish of the optical component after this fining process is typically anywhere from about 0.06 to 0.13 micrometer (Ra) and/or an Rtm greater than about 0.30 to 0.90 micrometer.

The roughness of a surface is typically due to scratches or a scratch pattern, which may or may not be visible to the naked eye. A scratch pattern can be defined as a series of peaks and valleys along the surface. Rtm and Ra are common measures of roughness used in the abrasives industry, however, the exact measuring procedure can vary with the type of equipment utilized in surface roughness evaluation. As used herein, Rtm and Ra measurements are based on procedures followed with the Rank Taylor Hobson (Leicester, England) profilometer, available under the trade designation SURTRONIC 3.

Ra is defined as an average roughness height value of an arithmetic average of the departures of the surface roughness profile from a mean line on the surface. Measurements are taken at points both above and below the mean line on the surface within an assessment length set by the Rank Taylor Hobson instrument. Ra and Rtm (defined below) are measured with a profilometer probe, which is a 5 micrometer radius diamond tipped stylus and the results are recorded in micrometers ($\mu$m). These departure measurements are totaled and then divided by the number of measurements to arrive at an average value. Generally, the lower the Ra value, the smoother the finish.

Rt is defined as the maximum peak-to-valley height. Rtm is the average, measured over five consecutive assessment lengths, of the maximum peak-to-valley height in each assessment length. In general, the lower the Rtm value. the smoother the finish. A slight variation in the Ra and Rtm values can, but not necessarily, occur when the measurement on the same finished glass surface is performed on different brands of commercially available profilometers.

The third step of the overall process is the polishing step which generates the smoother, optically clear surface on the glass article. In most instances, this polishing step is done with a loose abrasive slurry, since the loose slurry typically provides the means to generate an optically clear surface that is essentially free of any defects, imperfections and/or minute scratches. Typically, the loose abrasive slurry comprises ceria abrasive particles dispersed in water.

Although loose abrasive slurries are widely utilized in the fining and polishing steps of providing an optically clear surface finish on glass articles, loose abrasive slurries have many disadvantages associated with them. These disadvantages include the inconvenience of handling the required large volume of the slurry, the required agitation to prevent settling of the abrasive particles and to assure a uniform concentration of abrasive particles at the polishing interface, and the need for additional equipment to prepare, handle, and dispose of or recover and recycle the loose abrasive slurry. Additionally, the slurry itself must be periodically analyzed to assure its quality and dispersion stability which requires additional costly man hours. Furthermore, pump heads, valves, feed lines, grinding laps, and other parts of the slurry supply equipment which contact the loose abrasive slurry eventually show undesirable wear. Further, the steps which use the slurry are usually very untidy because the loose abrasive slurry, which is a viscous liquid, splatters easily and is difficult to contain.

Understandably, attempts have been made to replace the loose abrasive slurry fining and polishing steps with lapping coated abrasives to some degree of success. In general, a lapping coated abrasive comprises a backing having an abrasive coating bonded to it. This abrasive coating comprises a plurality of abrasive particles dispersed in a binder. For example, U.S. Pat. No. 4,255,164 (Butzke et al.), U.S. Pat. No. 4,576,612 (Shukla et al.), U.S. Pat. No. 4,733,502 (Braun) and European Patent Application No. 650,803 disclose various abrasive articles and polishing processes. Other references that teach lapping coated abrasive articles include U.S. Pat. No. 4.644,703 (Kaczmarek et al.), U.S. Pat. No. 4,773,920 (Chasman et al.) and U.S. Pat. No. 5,014,468 (Ravipati et al.). However, lapping coated abrasives have not completely replaced loose abrasive slurries. In some instances the lapping coated abrasives do not provide a surface which is optically clear and essentially free of defects, imperfections and/or minute scratches. In other instances, the lapping coated abrasives require a longer time to polish the glass article, thereby making it more cost effective to use a loose abrasive slurry. Similarly in some instances, the life of a lapping coated abrasive is not sufficiently long to justify the higher cost associated with the lapping coated abrasive in comparison to loose abrasive slurries. Thus in some instances, lapping coated abrasives are not as economically desirable as loose abrasive slurries.

What is desired by the glass industry is an abrasive article that does not exhibit the disadvantages associated with a loose abrasive slurry, but that is able to effectively and economically polish a glass surface in a reasonable time to optical clarity such that the glass surface is essentially free of imperfections, defects and/or scratches.

BRIEF SUMMARY OF THE INVENTION

One aspect of the invention is directed to an abrasive article for polishing a glass workpiece. The abrasive article includes a backing and at least one three-dimensional abrasive coating preferably comprising diamond particles dispersed within a binder bonded to a surface of the backing.

It is preferred that the at least one three-dimensional abrasive coating includes a plurality of abrasive composites. The plurality of abrasive composites can be precisely shaped composites, irregularly shaped composites or precisely shaped composites including a shape of a substantially truncated pyramid having a flat top. Preferably, the precisely shaped composites have a bottom portion defining a surface area not more than 60%, more preferably, not more than 40%, and most preferably, not more than 20% greater than a top portion.

Preferably, the binder is formed from a binder precursor comprising an ethylenically unsaturated resin, such as an acrylate resin. More preferably, the binder precursor comprises a urethane acrylate oligomer, an ethylenically unsaturated monomer, and blends thereof. The ethylenically unsaturated monomer preferably is selected from the group of mono functional acrylate monomers, difunctional acrylate monomers, trifunctional acrylate monomers, and mixtures thereof. Preferably, the binder precursor includes a urethane acrylate monomer in an amount of about 30 parts by weight to about 70 parts by weight and an ethylenically unsaturated monomer in an amount of about 70 parts by weight to about 30 parts by weight, more preferably from about 34 parts by weight to about 65 parts by weight urethane acrylate oligomer to about 46 parts by weight to about 54 parts by weight ethylenically unsaturated monomer and most preferably about 50 parts by weight urethane acrylate oligomer and about 50 parts by weight ethylenically unsaturated monomer.

It is preferred that the abrasive particles comprise diamond abrasive particles. Optionally, the diamond particles can be blended with other non-diamond hard abrasive particles, soft inorganic abrasive particles, and mixtures thereof. Preferably, the average size of the abrasive particles is about 0.01 micrometers to about 300 micrometers, more preferably about 5 micrometers to about 150 micrometers and, most preferably about 9 micrometers to about 80 micrometers.

In one embodiment of the invention, the abrasive article is capable of reducing an initial Ra of about 1.2 μm or greater on a glass test blank to a final Ra of about 0.7 μm or less using an RPP procedure having a polish time interval of about 25 seconds. Preferably, the diamond particles included in the abrasive article have an average size of about 74 micrometers.

In another embodiment of the invention, the abrasive article is capable of reducing an initial Ra of about 0.2 μm or greater on a glass test blank to a final Ra of about 0.12 μm or less using an RPP procedure having a polish time interval of about 25 seconds. Preferably, the diamond particles included in the abrasive article have an average size of about 30 micrometers to about 45 micrometers.

In yet another embodiment of the invention, the abrasive article is capable of reducing an initial Ra of about 0.05 μm or greater on a glass test blank to a final Ra of about 0.05 μm or less using an RPP procedure having a polish time interval of about 25 seconds. Preferably, the diamond particles included in the abrasive article have an average size of about 9 micrometers to about 15 micrometers, These abrasive articles can be provided sequentially in a glass polishing system to polish a glass workpiece which can result in a very fine surface finish.

The RPP Test Procedure

The "RPP" procedure utilizes a "Buehler Ecomet 4" variable speed grinder-polisher on which is mounted a "Buehler Ecomet 2" power head, both of which are commercially available from Buehler Industries, Ltd. of Lake Bluff, Ill. The test is performed using the following conditions: motor speed set at 500 rpm with a force 50 lbs., which is about 7.1 psi (about 50 kPa) over the surface area of the glass test blank.

A flat circular glass test blank is provided which has a 7.62 cm (3 inch) diameter and a thickness of approximately 1.0 cm, commercially available under the trade designation CORNING #9061 from Corning Glass Co. The glass material is placed into the power head of the grinder-polisher. The 12 inch aluminum platform of the grinder-polisher rotates counter clockwise while the power head, into which the glass test blank is secured, rotates clockwise at 35 rpm.

An abrasive article to be tested is die cut to a 20.3 cm (8.0 inch) diameter circle and is adhered with a pressure sensitive adhesive directly onto an extruded slab stock foam urethane backing pad which has a Shore A hardness of about 90 durometer. The urethane backing pad is attached to an extruded slab open cell, soft foam pad having a thickness of about 30 mm. This pad assembly is placed on the aluminum platform of the grinder/polisher. Tap water is sprayed onto the abrasive article at a flow rate of approximately 3 liters/minute to provide lubrication between the surface of the abrasive article and the glass test blank.

To provide a substantially similar initial surface finish on the glass test blank (i.e., prior to polishing with the abrasive articles), each glass test blank is abraded with a metal bonded diamond abrasive article commercially available under the trade designation "3M Flexible Diamond M125" from 3M (St. Paul, Minn.). These diamond particles have an average particle size of approximately 125 micrometers.

An initial surface finish on the glass test blank is evaluated with a diamond stylus profilometer, commercially available under the trade designation SURTRONIC 3 (112/1518-822323) from Taylor Hobson (Leicester, England). An initial weight of the glass test blank is also recorded. Initial surface finishes, or Ra values, for evaluating abrasive articles according to the invention typically fall within three categories: about 1.2 $\mu$m or greater, about 0.2 $\mu$m or greater, and about 0.05 $\mu$m or greater.

The glass test blank is polished using the grinder/polisher described above. The polishing time interval of the grinder/polisher is set at 15 seconds or 10 seconds. However, real time contact between the abrasive article and the glass test blank surface may be greater than the set time because the grinder/polisher will not begin timing until the abrasive article is stabilized on the glass test blank surface. That is, there may be some bouncing or skipping of the abrasive article on the glass surface and the grinder/polisher begins timing at the point when contact between the abrasive article and the glass surface is substantially constant. Thus, real time polish interval, i.e. the contact between the abrasive article and the glass surface, is about 25 seconds or less.

After polishing, final surface finish and a final weight are each recorded. The change in weight of the glass test blank over the polishing time ("X" seconds) is referred to as "cut rate" and is given in the units of grams (of glass stock removed)/"X" seconds).

It will be understood that the actual time (rate) necessary to polish a glass workpiece to an Ra value according to the procedures above will vary depending upon a number of factors, such as the polishing apparatus used, the backing pad under the abrasive article, the speed of the abrasive rotation, the size of the surface area to be polished, the contact pressure, the abrasive particle size, the initial condition of the surface to be polished, etc. Each of the RPP procedures above simply provide a baseline performance characteristic that can be used to compare the article and the method according to the invention with conventional glass polishing techniques.

Another aspect of the invention is directed to a method for polishing a glass workpiece by contacting the glass workpiece having an intitial Ra with an abrasive article, as described above, applying a liquid at an interface between the glass workpiece and the abrasive article, moving the glass workpiece and the abrasive article relative to one another, and reducing the initial Ra to a final Ra.

In one embodiment, the method includes contacting the glass workpiece having an initial Ra of about 1.2 $\mu$m or greater with an abrasive article capable of removing about 0.75 g of glass stock from a glass test blank using an RPP procedure having a polish time interval of about 25 seconds, wherein the initial Ra is reduced to a final Ra of about 0.7 $\mu$m or less. Preferably, the abrasive article includes diamond particles dispersed within a binder. More preferably, the abrasive particles have an average size of about 74 $\mu$m.

In another embodiment, the method includes contacting the glass workpiece having an initial Ra of about 0.2 $\mu$m or greater with an abrasive article capable of removing about 0.2 g of glass stock from a glass test blank using an RPP procedure having a polish time interval of about 25 seconds, wherein the initial Ra is reduced to a final Ra of about 0.05 $\mu$m or less. Preferably, the abrasive article includes diamond particles dispersed within a binder. More preferably, the abrasive particles have an average size of about 30 $\mu$m to about 45 $\mu$m.

In yet another embodiment, the method includes contacting the glass workpiece having an initial Ra of about 0.05 $\mu$m or greater with an abrasive article capable of removing about 0.02 g of glass stock from a glass test blank using an RPP procedure having a polish time interval of about 25 seconds, wherein the initial Ra is reduced to about 0.05 $\mu$m or less. Preferably, the abrasive article includes diamond particles dispersed within a binder. More preferably, the abrasive particles have an average size of about 9 $\mu$m to about 15 $\mu$m.

The abrasive articles of the invention used in grinding glass surfaces surprisingly provide smooth surfaces in relatively short periods of time. Although not wishing to be bound by any theory, it is believed that it is this binder chemistry which provides the abrasive article with its desired properties. In particular, it is believed that this binder chemistry provides a tough, durable and long lasting medium to securely hold the abrasive particles throughout the life of the abrasive article. This binder chemistry is especially efficacious when used with diamond abrasive particles. Because diamond abrasive particles last substantially longer than most conventional abrasive particles, a tough and durable binder is desired. Thus, this combination of urethane acrylate oligomer or blend of urethane acrylate oligomer with an acrylate monomer and diamond abrasive particles provides an abrasive coating that is long lasting and durable. It is hypothesized that the abrasive particles and the binder chemistry provide a synergistic combination for improved glass polishing results by using an abrasive article according to the invention.

"Precisely shaped," as used herein, describes the abrasive composites which are formed by curing the binder precursor while the precursor is both being formed on a backing and filling a cavity on the surface of a production tool. These abrasive composites have a three dimensional shape that is defined by relatively smooth-surfaced sides that are bounded and joined by well-defined sharp edges having distinct edge lengths with distinct endpoints defined by the intersections of the various sides. The abrasive article of this invention is referred to as "structured" in the sense of the deployment of a plurality of such precisely-shaped abrasive. The abrasive composites may also have a irregular shape which, as used herein, means that the sides or boundaries forming the abrasive composite are slumped and not precise. In an irregularly shaped abrasive composite, the abrasive slurry is first formed into the desired shape and/or pattern. Once the abrasive slurry is formed, the binder precursor in the abrasive slurry is cured or solidified. There is generally a time gap between forming the shape and curing the binder precursor. During this time gap, the abrasive slurry will flow and/or slump, thereby causing some distortion in the formed shape. The abrasive composites can also vary in size, pitch, or shape in a single abrasive article, as described in WO 95/07797, published Mar. 23, 1995 and WO 95/22436, published Aug. 24, 1995.

"Boundary," as used herein, refers to the exposed surfaces and edges of each composite that delimit and define the actual three-dimensional shape of each abrasive composite. These boundaries are readily visible and discernible when a cross-section of an abrasive article of this invention is viewed under a microscope. These boundaries separate and distinguish one abrasive composite from another even if the composites abut each other along a common border at their bases. For precisely shaped abrasive composites, the boundaries and edges are sharp and distinct. By comparison, in an abrasive article that does not have precisely shaped composites, the boundaries and edges are not definitive, i.e., the abrasive composite sags before completion of its curing. These abrasive composites, whether precisely or irregularly shaped, can be of any geometrical shape defined by a substantially distinct and discernible boundary, wherein the precise geometrical shape is selected from the group consisting of cubic, prismatic, conical, block-like truncated conical, pyramidal, truncated pyramidal, cylindrical, hemispherical and the like.

"Texture," as used herein, refers to a polishing layer having any of the aforementioned three dimensional composites, whether the individual three dimensional composites are precisely or irregularly shaped. The texture may be formed from a plurality of abrasive composites which all have substantially the same geometrical shape, i.e., the texture may be regular. Similarly, the texture may be in a random pattern where the geometrical shape differs from abrasive composite to abrasive composite.

"Optically clear surface" refers to a surface that is essentially free of any defects, imperfections and/or minute scratches visible to the naked eye.

DETAILED DESCRIPTION OF THE INVENTION

Figure 1:
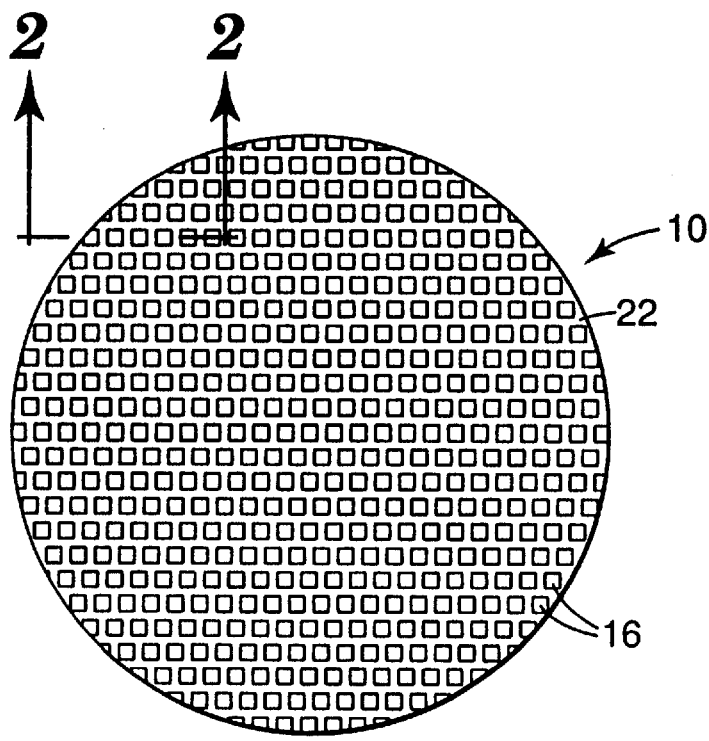
FIG. 1 is a plan view of one preferred abrasive article in accordance with the invention.

The present invention pertains to an article and a method of refining (preferably polishing) a glass workpiece with an abrasive article that comprises a backing and at least one three-dimensional abrasive coating preferably comprising diamond particles dispersed within a binder bonded to a surface of the backing. The abrasive coating comprises a binder formed from a binder precursor and a plurality of abrasive particles, preferably diamond abrasive particles.

The end use of the glass may be in a home or a commercial environment. The glass may be used for decorative purposes or structural purposes. The glass will have at least one surface that is to be polished. The glass may be relatively flat or it may have some contour associated with it. These contours can be in the shape of curves or corners. Examples of glass workpieces include optical components such as lenses, prisms, mirrors, CRT (cathode ray tube) screens and the like. CRT screens are found extensively in display surfaces used in devices such as television sets, computer monitors, computer terminals and the like. CRT screens range in size (as measured along the diagonal) of about 10 cm (4 inches) to about 100 cm (40 inches) or more. CRT screens have an outer surface that is convex and there is a radius of curvature. During polishing, the abrasive article of the invention will polish this CRT screen.

A. Binders

The binder is formed from a binder precursor. The binder precursor comprises a resin that is in an uncured or unpolymerized state. During the manufacture of the abrasive article, the resin in the binder precursor is polymerized or cured, such that a binder is formed. The binder precursor can comprise a condensation curable resin, an addition polymerizable resin, a free radical curable resin and/or combinations and blends thereof.

The preferred binder precursors are resins that polymerize via a free radical mechanism. The polymerization process is initiated by exposing the binder precursor, along with an appropriate catalyst, to an energy source such as thermal energy or radiation energy. Examples of radiation energy include electron beam, ultraviolet light or visible light.

Examples of free radical curable resins include acrylated urethanes, acrylated epoxies, acrylated polyesters, ethylenically unsaturated compounds, aminoplast derivatives having pendant unsaturated carbonyl groups, isocyanurate derivatives having at least one pendant acrylate group, isocyanate derivatives having at least one pendant acrylate group and mixtures and combinations thereof. The term acrylate encompasses acrylates and methacrylates.

One preferred binder precursor of the invention comprises a urethane acrylate oligomer, or a blend of a urethane acrylate oligomer and an ethylenically unsaturated monomer. The preferred ethylenically unsaturated monomers are mono functional acrylate monomers, difunctional acrylate monomers, trifunctional acrylate monomers or combinations thereof. Although not wishing to be bound by any theory, it is believed that it is the binder chemistry that results from the above mentioned binder precursors which provides the abrasive article with its desired properties. In particular, this binder chemistry provides a tough, durable and long lasting medium to securely hold the abrasive particles throughout the life of the abrasive article. This binder chemistry is especially efficacious when used with diamond abrasive particles because diamond abrasive particles last substantially longer than most conventional abrasive particles. In order to take full advantage of the long life associated with diamond abrasive particles, a tough and durable binder is desired. Thus, this combination of urethane acrylate oligomer or blend of urethane acrylate oligomer with an acrylate monomer and diamond abrasive particles provides an abrasive coating that is long lasting and durable.

Acrylated urethanes are also acrylate esters of hydroxy terminated isocyanate extended polyesters or polyethers. They can be aliphatic or aromatic. Examples of commercially available acrylated urethanes include those known by the trade designations PHOTOMER (e.g., PHOTOMER 6010) from Henkel Corp. Hoboken, N.J.; EBECRYL 220 (hexafunctional aromatic urethane acrylate of molecular weight 1000), EBECRYL 284 (aliphatic urethane diacrylate of 1200 molecular weight diluted with 1,6-hexanediol diacrylate), EBECRYL 4827 (aromatic urethane diacrylate of 1600 molecular weight), EBECRYL 4830 (aliphatic urethane diacrylate of 1200 molecular weigh diluted with tetraethylene glycol diacrylate), EBECRYL 6602 (trifunctional aromatic urethane acrylate of 1300 molecular weight diluted with trimethylolpropane ethoxy triacrylate), and EBECRYL 840 (aliphatic urethane diacrylate of 1000 molecular weight) from UCB Radcure Inc. Smyrna. Ga.; SARTOMER (e.g., SARTOMER 9635, 9645, 9655, 963-B80, 966-A80, etc.) from Sartomer Co., West Chester, Pa., and UVITHANE (e.g., UVITHANE 782) from Morton International, Chicago, Ill.

The ethylenically unsaturated monomers or oligomers, or acrylate monomers or oligomers may be mono functional, difunctional, trifunctional or tetrafunctional or even higher functionality. The term acrylate includes both acrylates and methacrylates. Ethylenically unsaturated binder precursors include both monomeric and polymeric compounds that contain atoms of carbon, hydrogen and oxygen, and optionally, nitrogen and the halogens. Oxygen or nitrogen atoms or both are generally present in ether, ester, urethane, amide, and urea groups. Ethylenically unsaturated compounds preferably have a molecular weight of less than about 4,000 and are preferably esters made from the reaction of compounds containing aliphatic monohydroxy groups or aliphatic polyhydroxy groups and unsaturated carboxylic acids, such as acrylic acid, methacrylic acid, itaconic acid, crotonic acid, isocrotonic acid, maleic acid, and the like. Representative examples of ethylenically unsaturated monomers include methyl methacrylate, ethyl methacrylate, styrene, divinylbenzene, hydroxy ethyl acrylate, hydroxy ethyl methacrylate, hydroxy propyl acrylate, hydroxy propyl methacrylate, hydroxy butyl acrylate, hydroxy butyl methacrylate, vinyl toluene, ethylene glycol diacrylate, polyethylene glycol diacrylate, ethylene glycol dimethacrylate, hexanediol diacrylate, triethylene glycol diacrylate, trimethylolpropane triacrylate, glycerol triacrylate, pentaerthyitol triacrylate, pentaerythritol trimethacrylate, pentaerythritol tetraacrylate and pentaerythritol tetramethacrylate. Other ethylenically unsaturated resins include monoallyl, polyallyl, and polymethallyl esters and amides of carboxylic acids, such as diallyl phthalate, diallyl adipate, and N,N-diallyladipamide. Still other nitrogen containing compounds include tris(2-acryl-oxyethyl) isocyanurate, 1,3,5-tri(2-methacryloxyethyl)-s-triazine, acrylamide, methylacrylamide, N-methyl-acrylamide, N,N-dimethylacrylamide, N-vinyl-pyrrolidone, and N-vinyl-piperidone, and CMD 3700, available from Radcure Specialties. Examples of ethylenically unsaturated diluents or monomers can be found in U.S. Pat. No. 5,236,472 (Kirk et al.) and U.S. Pat. No. 5,580,647 (Larson et al.).

In general the weight ratio between these acrylate monomers depends upon the weight percent of diamond abrasive particles desired in the final abrasive article. Typically, however, these acrylate monomers range from about 5 parts by weight to about 95 parts by weight urethane acrylate oligomer to about 5 parts by weight to about 95 parts by weight ethylenically unsaturated monomer. Preferably, these acrylate monomers range from about 30 parts by weight to about 70 parts by weight urethane acrylate oligomer to about 30 parts by weight to about 70 parts by weight ethylenically unsaturated monomer, more preferably from about 34 parts by weight to about 65 parts by weight urethane acrylate oligomer to about 46 parts by weight to about 54 parts by weight ethylenically unsaturated monomer and most preferably 50 parts by weight urethane acrylate oligomer to 50 parts by weight ethylenically unsaturated monomer.

Additional information concerning other potential useful binders and binder precursors can be found in assignee's co-pending patent application Ser. No. 08/694,014, filed Aug. 8, 1996, which is a continuation-in-part of patent application Ser. No. 08/557,727, filed Nov. 11, 1995, (Bruxvoort et al.) and U.S. Pat. No. 4,773,920 (Chasman et al.).

Acrylated epoxies are diacrylate esters of epoxy resins, such as the diacrylate esters of bisphenol A epoxy resin. Examples of commercially available acrylated epoxies include CMD 3500, CMD 3600, and CMD 3700, available from Radcure Specialties, and CN103, CN104, CN111, CN 112 and CN114 commercially available from Sartomer, West Chester, Pa.

Examples of polyester acrylates include Photomer 5007 and Photomer 5018 from Henkel Corporation, Hoboken, N.J.

The aminoplast resins have at least one pendant alpha, beta-unsaturated carbonyl group per molecule or oligomer. These unsaturated carbonyl groups can be acrylate, methacrylate or acrylamide type groups. Examples of such materials include N-(hydroxymethyl)-acrylamide, N,N'-oxydimethylenebisacrylamide, ortho and para acrylamidomethylated phenol, acrylamidomethylated phenolic novolac and combinations thereof. These materials are further described in U.S. Pat. No. 4,903,440 (Larson et al.) and U.S. Pat. No. 5,236,472 (Kirk et al.).

Isocyanurate derivatives having at least one pendant acrylate group and isocyanate derivatives having at least one pendant acrylate group are further described in U.S. Pat. No. 4,652,27 (Boettcher). The preferred isocyanurate material is a triacrylate of tris(hydroxy ethyl)isocyanurate.

Depending upon how the free radical curable resin is cured or polymerized, the binder precursor may further comprise a curing agent, (which is also known as a catalyst or initiator). When the curing agent is exposed to the appropriate energy source, it will generate a free radical source that will start the polymerization process.

The binder precursor may comprise an epoxy resin. Epoxy resins have an oxirane and are polymerized by the ring opening. Such epoxide resins include monomeric epoxy resins and polymeric epoxy reins. Examples of some preferred epoxy resins include 2,2-bis[4-(2,3-epoxypropoxy)-phenyl)propane, a diglycidyl ether of bisphenol, commercially available materials under the trade designation EPON 828, EPON 1004 and EPON 1001F available from Shell Chemical Co., and DER-331, DER-332 and DER-334 available from Dow Chemical Co. Other suitable epoxy resins include cycloaliphatic epoxies, glycidyl ethers of phenol formaldehyde novolac (e.g., DEN-431 and DEN-428 available from Dow Chemical Co. The blend of free radical curable resins and epoxy resins are further described in U.S. Pat. No. 4,751,138 (Tumey et al.) and U.S. Pat. No. 5,256, 170 (Harmer et al.).

It may be preferred in some instances to form the abrasive article by use of make and size coatings. In these abrasive article embodiments, a make coating is applied to a backing, the abrasive particles are applied to the backing, the make coating is exposed to conditions to at least partially cure the make coating, and a size coating is applied over the abrasive particles and make coating. The structure is then subjected to conditions sufficient to cure the make and size coatings. Optional presize and supersize coatings may also be applied as known in the art.

B. Backing Materials

Backings serve the function of providing a support for the abrasive composite formed by the combination of binder and abrasive particles. Backings useful in the invention must be capable of adhering to the binder after exposure of binder precursor to curing conditions, and are preferably flexible after said exposure so that the articles used in the inventive method may conform to surface contours, radii and irregularities in the glass.

In many glass polishing applications, the backing needs to be strong and durable so that the resulting abrasive article is long lasting. Additionally, in some polishing applications the backing needs to be strong and flexible so that the abrasive article can conform uniformly to the glass workpiece. This is typically true, when the glass workpiece has a shape or contour associated with it. The backing can be a polymeric film, paper, vulcanized fiber, a treated nonwoven backing or a treated cloth backing to provide these properties of strength and conformability. Examples of polymeric film include polyester film, co-polyester film, polyimide film, polyamide film and the like. A nonwoven, including paper, can be saturated with either a thermosetting or thermoplastic material to provide the necessary properties.

One preferred backing is a treated cloth backing. The cloth can be a J weight, X weight, Y weight or M weight cloth. The fibers or yarns forming the cloth can be selected from the group consisting of: polyester, nylon, rayon, cotton, fiberglass and combinations thereof. The cloth can be a knitted or woven cloth (e.g. drills, twills or sateen weaves) or it can be a stitch bonded or weft insertion cloth. The greige cloth can be textured, singed, desized or any conventional treatment for a greige cloth. It is preferred to treat the cloth with polymeric material to seal the cloth and to protect the cloth fibers. The treatment may involve one or more of the following treatments: a presize, a saturant or a backsize. One such treatment involves a presize coating applied first, followed by a backsize coating. Alternatively, a saturant coating, followed by a backsize coating. It is generally preferred that the front surface of the backing be relatively smooth. Likewise, the treatment coat(s) should result in the cloth backing being waterproof, since glass polishing is typically done in the presence of water. Similarly, the treatment coat(s) should result in the cloth backing having sufficient strength and flexibility. One preferred backing treatment is a crosslinked urethane acrylate oligomer blended with an acrylate monomer resin. It is within the scope of this invention that the cloth treatment chemistry is identical or is similar in nature to the chemistry of the binder. The cloth treatment chemistry may further comprise additives such as: fillers, dyes, pigments, wetting agents, coupling agents, plasticizers and the like.

Other treatment coatings include thermosetting and thermoplastic resins. Examples of typical and preferred thermosetting resins include phenolic resins, aminoplast resins, urethane resins, epoxy resins, ethylenically unsaturated resins, acrylated isocyanurate resins, urea-formaldehyde resins, isocyanurate resins, acrylated urethane resins, acrylated epoxy resins, bismaleimide resins and mixtures thereof. Examples of preferred thermoplastic resins include polyamide resins (e.g. nylon), polyester resins and polyurethane resins (including polyurethane-urea resins). One preferred thermoplastic resin is a polyurethane derived from the reaction product of a polyester polyol and an isocyanate.

C. Abrasive Particles

The abrasive articles according to the invention also include a plurality of abrasive particles. The term "abrasive particles" is meant to include single abrasive particles bonded together by a binder to form an abrasive agglomerate or composite. Abrasive agglomerates are further described in U.S. Pat. Nos. 4,311,489; 4,652,275 and 4,799,939. The abrasive particle may further comprise a surface treatment or coating, such as a coupling agent or metal or ceramic coatings.

Abrasive particles useful in the invention preferably have an average particle size about 0.01 $\mu$micrometer (small particles) to 300 micrometers (large particles), more preferably about 5 micrometers to about 150 micrometers, and most preferably about 9 micrometers to about 80 micrometers. It is preferred that the abrasive particles have a Mohs hardness of at least 8, more preferably at least 9. Examples of such abrasive particles include fused aluminum oxide, ceramic aluminum oxide, heated treated aluminum oxide, silicon carbide, alumina zirconia, iron oxide, diamond (natural and synthetic), ceria, cubic boron nitride, garnet and combinations thereof.

For glass polishing, it is preferred that the abrasive article utilize diamond abrasive particles. These diamond abrasive particles can be natural or synthetically made diamonds. Relative to synthetically made diamonds, the particles may be considered "resin bond diamonds", "saw blade grade diamonds" or "metal bond diamonds". The diamonds may have a blocky shape associated with them or alternatively, a needle like shape. The diamond particles may contain a surface coating such as a metal coating (e.g., nickel, aluminum, copper or the like), an inorganic coating (e.g., silica) or an organic coating. The abrasive article of the invention may contain a blend of diamond with other abrasive particles.

The three-dimensional abrasive coating can comprise by weight anywhere between about 0.1 part abrasive particles to 90 parts abrasive particles and 10 parts binder to 99.9 parts binder. However due to the expense associated with diamond abrasive particles, it is preferred that the abrasive coating comprise about 0.1 to 50 parts abrasive particles and about 50 to 99.9 parts binder. More preferably, the abrasive coating comprises about 1 to 30 parts abrasive particles and about 70 to 99 parts binder and most preferably, the abrasive coating comprises about 3 to 25 parts abrasive particles and about 75 to 97 parts binder.

D. Additives

The abrasive coating of this invention can further comprise optional additives, such as, abrasive particle surface modification additives, coupling agents, fillers, expanding agents, fibers, antistatic agents, curing agents, suspending agents, photosensitizers, lubricants, wetting agents, surfactants, pigments, dyes, UV stabilizers, and antioxidants. The amounts of these materials are selected to provide the properties desired.

Coupling Agents

A coupling agent can provide an association bridge between the binder and the abrasive particles. Additionally the coupling agent can provide an association bridge between the binder and the filler particles. Examples of coupling agents include silanes, titanates, and zircoaluminates. There are various means to incorporate the coupling agent. For example, the coupling agent may be added directly to the binder precursor. The abrasive coating may contain anywhere from about 0 to 30%, preferably between 0.1 to 25% by weight coupling agent. Alternatively, the coupling agent may be applied to the surface of the filler particles. In yet another mode, the coupling agent is applied to the surface of the abrasive particles prior to being incorporated into the abrasive article. The abrasive particle may contain anywhere from about 0 to 3% by weight coupling agent, based upon the weight of the abrasive particle and the coupling agent. Examples of commercially available coupling agents include "A174" and "A1230" from OSI. Still another example of a commercial coupling agent is an isopropyl triisosteroyl titanate commercially available from Kenrich Petrochemicals, Bayonne, N.J., under the trade designation "KR-TTS".

Fillers

The abrasive coating can further optionally comprise a filler. A filler is a particulate material and generally has an average particle size range between 0.1 to 50 micrometers, typically between 1 to 30 micrometers. Examples of useful fillers for this invention include: metal carbonates (such as calcium carbonate (chalk, calcite, marl, travertine, marble and limestone), calcium magnesium carbonate, sodium carbonate, magnesium carbonate), silica (such as quartz, glass beads, glass bubbles. and glass fibers) silicates (such as talc, clays, (montmorillonite) feldspar, mica, calcium silicate, lithiaum silicate, calcium metasilicate, sodium aluminosilicate, sodium silicate) metal sulfates (such as calcium sulfate, barium sulfate, sodium sulfate, aluminum sodium sulfate, aluminum sulfate), gypsum, vermiculite, wood flour, aluminum trihydrate, carbon black, metal oxides (such as calcium oxide (lime), aluminum oxide, tin oxide (e.g. stannic oxide), titanium dioxide) and metal sulfites (such as calcium sulfite), thermoplastic particles (polycarbonate, polyetherimide, polyester, polyethylene, polysulfone, polystyrene, acrylonitrile-butadiene-styrene block copolymer, polypropylene, acetal polymers, polyurethanes, nylon particles) and thermosetting particles (such as phenolic bubbles, phenolic beads, polyurethane foam particles and the like). The filler may also be a salt such as a halide salt. Examples of halide salts include sodium chloride, potassium cryolite, sodium cryolite, ammonium cryolite, potassium tetrafluoroboate, sodium tetrafluoroborate, silicon fluorides, potassium chloride, magnesium chloride. Examples of metal fillers include, tin, lead, bismuth, cobalt, antimony, cadmium, iron titanium. Other miscellaneous fillers include sulfur, organic sulfur compounds, graphite and metallic sulfides. One preferred filler is potassium silicate. Potassium silicate enhances the erodibility of the abrasive coating of the abrasive article and during abrasion increases the pH of the surrounding environment, such as the substrate surface.

Suspending Agents

An example of a suspending agent is an amorphous silica particle having a surface area less than 150 meters square/gram that is commercially available from DeGussa Corp., Ridgefield Park, N.J., under the trade name "OX-50". The addition of the suspending agent can lower the overall viscosity of the abrasive slurry. The use of suspending agents is further described in U.S. Pat. No. 5,368,619.

Curing Agents

The binder precursor may further comprise a curing agent. A curing agent is a material that helps to initiate and complete the polymerization or crosslinking process such that the binder precursor is converted into a binder. The term curing agent encompasses initiators, photoinitiators, catalysts and activators. The amount and type of the curing agent will depend largely on the chemistry of the binder precursor.

Free Radical Initiators

Polymerization of the preferred ethylenically unsaturated monomer(s) or oligomer(s) occurs via a free-radical mechanism. If the energy source is an electron beam, the electron beam generates free-radicals which initiate polymerization. However, it is within the scope of this invention to use initiators even if the binder precursor is exposed to an electron beam. If the energy source is heat, ultraviolet light, or visible light, an initiator may have to be present in order to generate free-radicals. Examples of initiators (i.e., photoinitiators) that generate free-radicals upon exposure to ultraviolet light or heat include, but are not limited to, organic peroxides, azo compounds, quinones, nitroso compounds, acyl halides, hydrazones, mercapto compounds, pyrylium compounds, imidazoles, chlorotriazines, benzoin, benzoin alkyl ethers, diketones, phenones, and mixtures thereof. An example of a commercially available photoinitiator that generates free radicals upon exposure to ultraviolet light include IRGACURE 651 and IRGACURE 184 commercially available from the Ciba Geigy Company, Hawthorne, N.J., and DAROCUR 1173 commercially available from Merck. Examples of initiators that generate free-radicals upon exposure to visible light can be found in U.S. Pat. No. 4,735,632. Another photoinitiator that generates free-radicals upon exposure to visible light has the trade name IRGACURE 369, commercially available from Ciba Geigy Company.

Typically, the initiator is used in amounts ranging from 0.1 to 10%, preferably 2 to 4% by weight, based on the weight of the binder precursor. Additionally, it is preferred to disperse, preferably uniformly disperse, the initiator in the binder precursor prior to the addition of any particulate material, such as the abrasive particles and/or filler particles.

In general, it is preferred that the binder precursor be exposed to radiation energy, preferably ultraviolet light or visible light. In some instances, certain abrasive particles and/or certain additives will absorb ultraviolet and visible light, which makes it difficult to properly cure the binder precursor. This phenomena is especially true with ceria abrasive particles and silicon carbide abrasive particles. It has been found, quite unexpectedly, that the use of phosphate containing photoinitiators, in particular acylphosphine oxide containing photoinitiators, tend to overcome this problem. An example of such a photoinitiator is 2,4,6-trimethylbenzoyldiphenylphosphine oxide which is commercially available from BASF Corporation, Charlotte, N.C., under the trade designation LUCIRIN TPO. Other examples of commercially available acylphosphine oxides include DAROCUR 4263 and DAROCUR 4265, both commercially available from Merck.

Photosensitizers

Optionally, the curable compositions may contain photosensitizers or photoinitiator systems which affect polymerization either in air or in an inert atmosphere, such as nitrogen. These photosensitizers or photoinitiator systems include compounds having carbonyl groups or tertiary amino groups and mixtures thereof. Among the preferred compounds having carbonyl groups are benzophenone, acetophenone, benzil, benzaldehyde, o-chlorobenzaldehyde, xanthone, thioxanthone, 9,10-anthraquinone, and other aromatic ketones which can act as photosensitizers. Among the preferred tertiary amines are methyldiethanolamine, ethyldiethanolamine, triethanolamine, phenylmethylethanolamine, and dimethylaminoethylbenzoate. In general, the amount of photosensitizer or photoinitiator system may vary from about 0.01 to 10% by weight, more preferably from 0.25 to 4.0% by weight, based on the weight of the binder precursor. Examples of photosensitizers include QUANTICURE ITX, QUANTICURE QTX, QUANTICURE PTX, QUANTICURE EPD, all commercially available from Biddle Sawyer Corp.

The abrasive article according to the invention comprises a backing having an abrasive coating bonded to the backing. It is preferred that the abrasive coating comprising a plurality of shaped abrasive composites. These abrasive composites can be precisely shaped or irregularly shaped. It is preferred that the abrasive composites be precisely shaped, because precisely shaped composites are more uniform and consistent.

Figure 2:
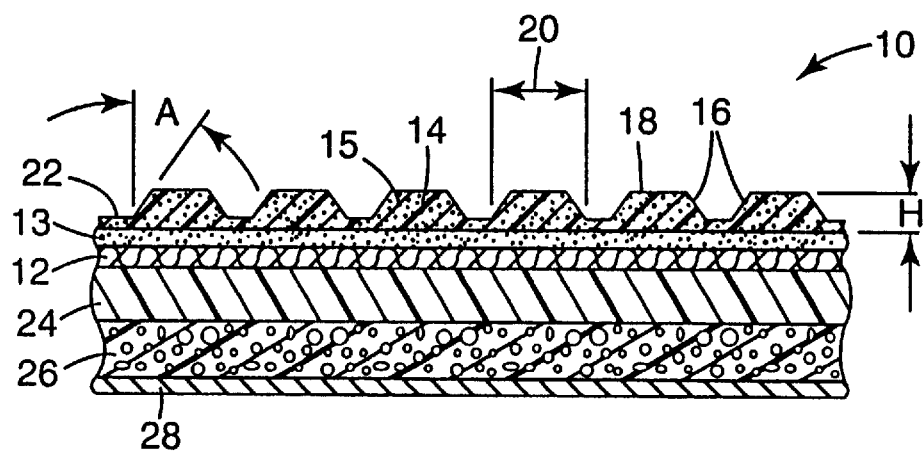
FIG. 2 is an enlarged cross section taken along the line 2—2 of the abrasive article illustrated in FIG. 1.

Referring now to the drawing figures, one preferred embodiment of an abrasive article 10 in accordance with the invention is illustrated in FIGS. 1 and 2 in plan and enlarged sectional views, respectively. The abrasive article 10 includes a backing 12 bearing on one major surface thereof abrasive composites 16. The abrasive composites 16 include a plurality of abrasive particles 14 dispersed in a binder 15. The abrasive particles 14 may be of a mixture of different abrasive materials. The binder 15 may be used to bind the abrasive composites 16 to the backing 12. A presize coating or tie layer 13 may optionally be interposed between the abrasive composites 16 and the backing 12.

The abrasive composites 16 preferably have a discernible shape. Initially, it is preferred that the abrasive particles do not protrude beyond the surface of the binder 15. As the abrasive article 10 is being used to abrade a surface, the composition breaks down to reveal unused abrasive particles 14.

The abrasive composite shape can be any shape. Typically the cross-sectional surface area of the base side of the shape that is in contact with the backing is larger in value than that of the distal end of the composite spaced from the backing. The shape of the composite can be selected from among a number of geometric shapes such as a cubic, block-like, cylindrical, prismatic, rectangular, pyramidal, truncated pyramidal, conical, truncated conical, cross, post-like with a top surface which is flat. Another shape is hemispherical and this is further described in PCT WO 95/22436. The resulting abrasive article can have a mixture of different abrasive composite shapes.

The base abrasive composites can abut one another or alternatively, the bases of adjacent abrasive composites may be separated from one another by some specified distance. It is to be understood that this definition of abutting also covers an arrangement where adjacent composites share a common abrasive material land or bridge-like structure which contacts and extends between facing sidewalls of the composites. The abrasive material land is formed from the same abrasive slurry used to form the abrasive composites. The composites are "adjacent" in the sense that no intervening composite is located on a direct imaginary line drawn between the centers of the composites.

One preferred shape of the abrasive composites 16 is generally a truncated pyramid having a flat top 18 and a base 20 that flares outward, as shown in FIG. 2. It is preferred to provide a height "H" of the abrasive composites 16 is constant across the coated abrasive article 10, but it is possible to have abrasive composites of varying heights. The height "H" of the composites can be a value from about 10 to about 1500 micrometers, preferably about 25 to about 1000 micrometers, more preferably from about 100 to about 600 micrometers and most preferably from about 300 to about 500 micrometers.

It is preferred that the bases 20 of adjacent abrasive composites be separated from one another by land area 22. Although not wishing to be bound by any theory, it is postulated that this land area 22, or separation, provides a means to allow the fluid medium to freely flow between the abrasive composites. It is believed then that this free flow of the fluid medium tends to contribute to a better cut rate surface finish or increased flatness during glass polishing. The spacing of the abrasive composites can vary from about 1 abrasive composite per linear cm to about 100 abrasive composite per linear cm, preferably between about 5 abrasive composites per linear cm to about 20 abrasive composite per linear cm, more preferably between about 5 abrasive composite per linear cm to about 10 abrasive composite per linear cm, and most preferably between about 6–7 abrasive composites per linear cm.

In one aspect of the abrasive article, there is an area spacing of at least 5 composites/cm$^2$ and preferably at least 100 composites/cm$^2$. In a further embodiment of the invention, the area spacing of composites ranges from about 1 to 12,000 composites/cm$^2$.

Where a rectangle or truncated pyramidal shape is used, the base 20 generally has a length of from about 100 to 500 micrometers. The sides forming the abrasive composites may be straight or tapered. If the sides are tapered, it is generally easier to remove the abrasive composites 16 from the cavities of the production tool, as discussed below. Angle "A" in FIG. 2 is measured from an imaginary vertical line which intersects the base 20 of the abrasive composite 16 at the point where it joins the land area 22 between the abrasive composites 16, i.e., the imaginary line is normal to the land area 22. The angle "A" can range from about 1 degree to about 75 degrees, preferably from about 2 degrees to about 50 degrees, more preferably from about 3 degrees to about 35 degrees, and most preferably from about 5 degrees to about 15 degrees.

In a polishing procedure, abrasive article backing 12 is attached to a backing pad 24, such as a urethane backing pad which has a Shore A hardness of about 90 durometer or a silicone foam pad having a Shore A hardness of about 65 durometer, to name a few. Abrasive article backing 12 may be adhered with a pressure sensitive adhesive directly onto backing pad 24. Backing pad 24 is attached to a foam pad 26 which provides a cushion for the abrasive article during polishing. Foam pad 26, including the abrasive article, is then mounted on a polisher platform 28.

Figure 3:
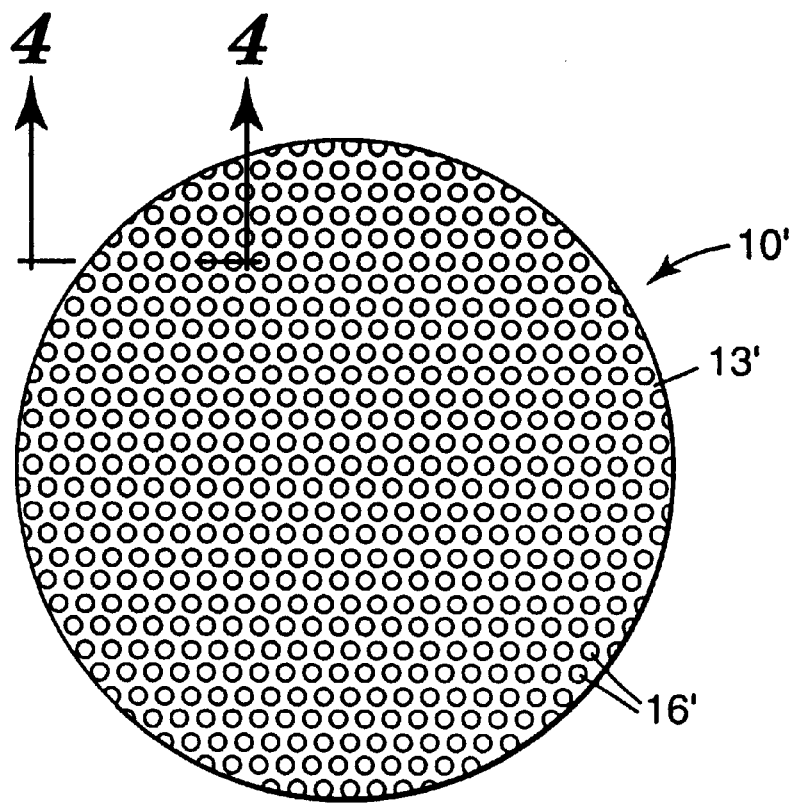
FIG. 3 is a plan view of another preferred abrasive article in accordance with the invention.
Figure 4:
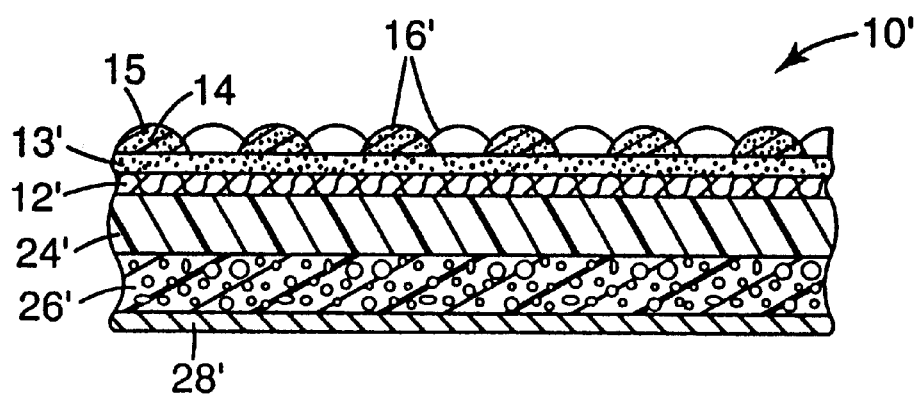
FIG. 4 is an enlarged cross section taken along 4—4 of the abrasive article illustrated in FIG. 3.

Referring now to the drawing FIGS. 3 and 4, another preferred embodiment of an abrasive article 10' in accordance with the invention is illustrated in FIGS. 3 and 4 in plan and enlarged sectional views, respectively. In this embodiment, the abrasive composites 16' are hemispherical in shape, as shown in FIG. 4. The abrasive article 10' has a woven polyester backing 12' which is sealed on one major surface with a thermoplastic polyester presize coating 13'.

To the hardened presize coating 13', a slurry is applied through a screen (not shown), the slurry comprising abrasive particles and the binder precursor. The hemispherical abrasive composites 16' may vary in size and shape and may be distributed randomly or uniformly on the presize coating 13'. Preferably, the hemispherical abrasive composites 16' appear circular from a plan view, FIG. 3, and have the same diameter. Backing pad 24' is attached to foam pad 26'. The foam pad 26' is mounted on a polisher platform 28'.

Regardless of the shape of the individual abrasive composites, preferably about 20% to about 90%, more preferably about 40% to about 70%, and most preferably about 50% to about 60%, of the surface area of the backing will be covered by abrasive composites. Additionally, a surface area difference between the base and the top surface is preferably about 0% to about 60%, more preferably about 0% to about 40%, and most preferably about 0% to about 20%.

Method of Making a Precisely Shaped Abrasive Composites

The first step to make the abrasive article is to prepare the abrasive slurry. The abrasive slurry is made by combining together by any suitable mixing technique the binder precursor, the abrasive particles and the optional additives. Examples of mixing techniques include low shear and high shear mixing, with high shear mixing being preferred. Ultrasonic energy may also be utilized in combination with the mixing step to lower the abrasive slurry viscosity. Typically, the abrasive particles are gradually added into the binder precursor. It is preferred that the abrasive slurry be a homogeneous mixture of binder precursor, abrasive particles and optional additives. If necessary water and/or solvent can be added to lower the viscosity. The amount of air bubbles in the abrasive slurry can be minimized by pulling a vacuum either during or after the mixing step. In some instances it is preferred to heat, generally in the range from about 30° C. to about 70° C., the abrasive slurry to lower the viscosity. It is important the abrasive slurry be monitored before coating to ensure a rheology that coats well and in which the abrasive particles and other fillers do not settle before coating.

This method generally results in an abrasive composite that has a precise shape. To obtain the precise shape, the binder precursor is substantially solidified or cured while the abrasive slurry is present in cavities of a production tool. Alternatively, the production tool is removed from the binder precursor prior to substantial curing, resulting in a slumped, somewhat irregularly shaped side walls.

The preferred method of producing the abrasive article comprising precisely-shaped abrasive composites uses a production tool containing a plurality of cavities. These cavities are essentially the inverse shape of the desired abrasive composites and are responsible for generating the shape of the abrasive composites. The number of cavities/ square unit area results in the abrasive article having a corresponding number of abrasive composites/square unit area. These cavities can have any geometric shape such as a cylinder, dome, pyramid, rectangle, truncated pyramid, prism, cube, cone, truncated cone or any shape having a top surface cross-section being a triangle, square, circle, rectangle, hexagon, octagon, or the like. The dimensions of the cavities are selected to achieve the desired number of abrasive composites/square unit area. The cavities can be present in a dot like pattern with spaces between adjacent cavities or the cavities can butt up against one another.

The abrasive slurry can be coated into the cavities of the production tool by any conventional technique such as die coating, vacuum die coating, spraying, roll coating, transfer coating, knife coating and the like. If the production tool comprises cavities that either have either flat tops or relatively straight side walls, then it is preferred to use a vacuum during coating to minimize any air entrapment.

The production tool can be a belt, a sheet, a continuous sheet or web, a coating roll such as a rotogravure roll, a sleeve mounted on a coating roll, or die. The production tool can be composed of metal, including a nickel-plated surface, metal alloys, ceramic, or plastic. Further information on production tools, their production, materials, etc. can be found in U.S. Pat. No. 5,152,917 (Pieper et al.) and U.S. Pat. No. 5,435,816 (Spurgeon et al.). One preferred production tool is a thermoplastic production tool that is embossed off of a metal master.

When the abrasive slurry comprises a thermosetting binder precursor, the binder precursor is cured or polymerized. This polymerization is generally initiated upon exposure to an energy source. In general, the amount of energy depends upon several factors such as the binder precursor chemistry, the dimensions of the abrasive slurry, the amount and type of abrasive particles and the amount and type of the optional additives. Radiation energy is the preferred energy source. The radiation energy sources include electron beam, ultraviolet light, or visible light. Electron beam(ionizing) radiation can be used at an energy level of about 0.1 to about 10 Mrad, preferably at an energy level of about 0.1 to about 10 Mrad. Ultraviolet radiation refers to non-particulate radiation having a wavelength within the range of about 200 to about 400 nanometers, preferably within the range of about 250 to 400 nanometers. The preferred output of the radiation source is 118 to 236 Watt/cm. Visible radiation refers to non-particulate radiation having a wavelength within the range of about 400 to about 800 nanometers, preferably in the range of about 400 to about 550 nanometers.

After the production tool is coated, the backing and the abrasive slurry are brought into contact by any means such that the abrasive slurry wets the front surface of the backing. The abrasive slurry is brought into contact with the backing by means of a contact nip roll, for example. Next, some form of energy, such as described herein, is transmitted into the abrasive slurry by an energy source to at least partially cure the binder precursor. For example, the production tool can be transparent material (e.g. polyester, polyethylene or polypropylene) to transmit light radiation to the slurry contained in the cavities in the tool. The term "partial cure" is meant that the binder precursor is polymerized to such a state that the abrasive slurry does not flow when the abrasive slurry is removed from the production tool. The binder precursor, if not fully cured, can be fully cured by any energy source after it is removed from the production tool. Other details on the use of a production tool to make the abrasive article according to this preferred method is further described in U.S. Pat. No. 5,152,917 (Pieper et al.), where the coated abrasive article that is produced is an inverse replica of the production tool, and U.S. Pat. No. 5,435,816 (Spurgeon et al.).

In another variation of this first method, the abrasive slurry can be coated onto the backing and not into the cavities of the production tool. The abrasive slurry coated backing is then brought into contact with the production tool such that the abrasive slurry flows into the cavities of the production tool. The remaining steps to make the abrasive article are the same as detailed above. Relative to this method, it is preferred that the binder precursor is cured by radiation energy. The radiation energy can be transmitted through the backing and/or through the production tool. If the radiation energy is transmitted through either the backing or production tool then, the backing or production tool should not appreciably absorb the radiation energy. Additionally, the radiation energy source should not appreciably degrade the backing or production tool. For instance ultraviolet light can be transmitted through a polyester film backing.

Alternatively, if the production tool is made from certain thermoplastic materials, such as polyethylene, polypropylene, polyester, polycarbonate, poly(ether sulfone), poly(methyl methacrylate), polyurethanes, polyvinylchloride, or combinations thereof, ultraviolet or visible light can be transmitted through the production tool and into the abrasive slurry. In some instances, it is preferred to incorporate ultraviolet light stabilizers and/or antioxidants into the thermoplastic production tool. The more deformable material results in easier processing. For thermoplastic based production tools, the operating conditions for making the abrasive article should be set such that excessive heat is not generated. If excessive heat is generated, this may distort or melt the thermoplastic tooling.

After the abrasive article is made, it can be flexed and/or humidified prior to converting into a suitable form/shape before the abrasive article is used.

Another method to make an abrasive article is to bond a plurality of abrasive agglomerates to a backing. These abrasive agglomerates comprise a plurality of abrasive particles bonded together to form a shaped mass by means of a first binder. The resulting abrasive agglomerates are then dispersed in a second binder precursor and coated onto a backing. The second binder precursor is solidified to form a binder and the abrasive agglomerates are then bonded to the backing.

The abrasive agglomerates can include the optional additives as discussed above. The abrasive agglomerates should have a desired rate of erodibility such that they break down during usage. Again, this erodibility rate can be determined by the abrasive particle type, first binder type, additive types and ratios thereof.

Abrasive agglomerates can be made by any conventional process such as those detailed in U.S. Pat. Nos. 4,311,489; 4,652,275, 4,799,939, and 5,500,273.

The abrasive agglomerates are dispersed in a second binder precursor to form an abrasive slurry. The remaining steps to make the abrasive article can be the same as that discussed herein. Alternatively, the abrasive slurry can be applied onto the backing as knife coated, roll coated, sprayed, gravure coated, die coated, curtain coated or other conventional coating techniques. Then the abrasive slurry is exposed to an energy source to cure the binder precursor and convert the abrasive slurry into an abrasive composite.

Method of Making Non-Precisely Shaped Abrasive Composites

A second method for making the abrasive article pertains to method in which the abrasive composites are non-precisely shaped or irregularly shaped. In this method, the abrasive slurry is exposed to an energy source once the abrasive slurry is removed from the production tool. The first step is to coat the front side of the backing with an abrasive slurry by any conventional technique such as drop die coater, roll coater, knife coater, curtain coater, vacuum die coater, or a die coater. If desired, it is possible to heat the abrasive slurry and/or subject the slurry to ultrasonics prior to coating to lower the viscosity. Next, the abrasive slurry/backing combination is brought into contact with a production tool. The production tool can be the same type of production tool described above. The production tool comprises a series of cavities and the abrasive slurry flows into these cavities. Upon removal of the abrasive slurry from the production tool, the abrasive slurry will have a pattern associated with it; the pattern of abrasive composites is formed from the cavities in the production tool. Following removal, the abrasive slurry coated backing is exposed to an energy source to initiate the polymerization of the binder precursor and thus forming the abrasive composites. It is generally preferred that the time between release of the abrasive slurry coated backing from the production tool to curing of the binder precursor is relatively minimal. If this time is too long, the abrasive slurry will flow and the pattern will distort to such a degree that the pattern essentially disappears.

In another variation of this second method, the abrasive slurry can be coated into the cavities of the production tool and not onto the backing. The backing is then brought into contact with the production tool such that the abrasive slurry wets and adheres to the backing. In this variation, for example, the production tool may be a rotogravure roll. The remaining steps to make the abrasive article are the same as detailed above.

Yet another variation is to spray or coat the abrasive slurry through a screen to generate a pattern. Then the binder precursor is cured or solidified to form the abrasive composites.

A further technique to make an abrasive article that has an abrasive coating having pattern or texture associated with it to provide a backing that is embossed and then coat the abrasive slurry over the backing. The abrasive coating follows the contour of the embossed backing to provide a pattern or textured coating.

Still another method to make an abrasive article is described in U.S. Pat. No. 5,219,462. An abrasive slurry is coated into the recesses of an embossed backing. The abrasive slurry contains abrasive particles, binder precursor and an expanding agent. The resulting construction is exposed to conditions such that the expanding agent causes the abrasive slurry to expand above the front surface of the backing. Next the binder precursor is solidified to form a binder and the abrasive slurry is converted into abrasive composites.

The abrasive article can be converted into any desired shape or form depending upon the desired configuration for glass polishing. This converting can be accomplished by slitting, die cutting or any suitable means.

Methods of Polishing Glass

Prior to polishing in accordance with the method of the invention, the glass will typically be subjected to a variety of physical processes (including abrading) to achieve the desired dimensions of the glass. These previous processes may leave scratches or expose defects in the glass surface which typically result in a dull appearing surface. The present invention pertains to a method of polishing the glass surface to remove enough of the scratch depth and defects to provide a surface that can be polished to optical clarity.

There are typically more than one "polishing" or "fining" articles used in the polishing step of the method of the invention. In the past, one abrasive article having a given average abrasive particle size is not sufficient to generate a very high gloss surface. Rather a sequence of abrasive articles is employed during which the average scratch depth is continuously reduced. The first abrasive article employed will typically contain abrasive particles that have a larger particle size. As the polishing continues, the abrasive particle size in the abrasive article employed is continually reduced by the user by changing the abrasive article. This results in a gradual reduction in scratch depth. The number of abrasive articles, time for polishing, types of abrasive particles and sizes of abrasive particles will depend upon various factors such as the size of the glass surface being polished, the severity of scratches and/or defects present in the glass prior to polishing and the composition of the glass itself.

It is preferred to polish the glass in the presence of a liquid. The liquid has several advantages associated with it. It inhibits heat build up during polishing and removes the swarf away from the polishing interface. "Swarf" is the term used to describe the actual glass debris that is abraded away by the abrasive article. In some instances, the glass swarf can damage the surface of the glass being polished. Thus it is desirable to remove the swarf from the interface. Polishing in the presence of a liquid also results in a finer finish on the glass surface. This liquid can be water, an organic lubricant, a detergent, a coolant or combinations thereof. The liquid may further contain additives to enhance polishing. Water is generally the preferred liquid.

During polishing the abrasive article moves relative to the glass surface and is forced downward onto the glass surface preferably the force ranging from about 0.35 g/mm$^2$ to about 7.0 g/mm$^2$, more preferably from about 0.7 g/mm$^2$ to about 3.5 g/mm$^2$, and most preferably about 5 g/mm$^2$. If the downward force is too high, then the abrasive article may not refine the scratch depth and in some instances may increase the scratch depth. Also, the abrasive article may wear excessively if the down force is too high. Conversely, if the downward force is too low, the abrasive article may not effectively refine the scratch depth and generate an optically clear surface.

As stated, the glass or the abrasive article or both will move relative to the other during the polishing step. This movement can be a rotary motion, a random motion, or linear motion. Rotary motion can be generated by attaching an abrasive disc to a rotary tool. The glass surface and abrasive article may rotate in the same direction or opposite directions, but if in the same direction, at different rotational speeds. For machines, operating rpm may range up to about 4000 rpm. preferably from about 25 rpm to about 2000 rpm, and more preferably from about 50 rpm to about 1000 rpm, depending on the abrasive article employed. For example, when discs such as illustrated in FIGS. 1 and 2 are used, the machine may have a rotational speed of about 25 rpm to about 2000 rpm, typically about 500 rpm. A random orbital motion can be generated by a random orbital tool, and linear motion can be generated by a continuous abrasive belt. The relative movement between glass and abrasive article may also depend on the dimensions of the glass. If the glass is relatively large, it may be preferred to move the abrasive article during polishing while the glass is held stationary.

In many instances, the abrasive article is bonded to a support pad. The support pad is typically a compressible material that provides support for the abrasive article. Likewise the support pad will be made from a conformable material such that when the abrasive article is attached to the support pad, the resulting article can conform to the glass workpiece as necessary, especially for glass workpieces that are contoured or have a shape associated with them. The support pad can be made from a polyurethane foam, rubber material, an elastomer, a rubber based foam or any other suitable material. The hardness and/or compressibility of the support pad material is selected to provide the desired polishing characteristics (cut rate, abrasive article product life and glass workpiece surface finish).

The support pad may have a continuous and relatively flat surface that the abrasive article is secured to. Alternatively, the support pad may have a discontinuous surface in which there exists a series of raised portions and lower portions in which the abrasive article is secured to. In the case of a discontinuous surface, the abrasive article may be secured to only the raised portions. Conversely, the one abrasive article segment may be secured to more than one raised portion, such that the entire abrasive article is not fully supported. The discontinuous surface in the support pad is selected to provide the desired fluid flow of the water and the desired polishing characteristics (cut rate, abrasive article product life and glass workpiece surface finish).

Alternatively it is within the scope of this invention that the backing for the abrasive article serves as the support pad. For example, the backing may be a foam backing such as a polyurethane foam.

The support pad can have any shape such as circular, rectangular, square, oval and the like. The support pad can range in size (longest dimension) from about 5 cm to 1500 cm.

Attachment Means

The abrasive article is secured to the support pad by an attachment means. This attachment means may be a pressure sensitive adhesive, hook and loop attachment, a mechanical attachment or a permanent adhesive. The attachment means should be such that the abrasive article can be firmly secured to the support pad and survive the rigors of glass polishing (wet environment, heat generation and pressures).

Representative examples of pressure sensitive adhesives suitable for this invention include latex crepe, rosin, acrylic polymers and copolymers e.g., polybutylacrylate, polyacrylate ester, vinyl ethers, e.g., polyvinyl n-butyl ether, alkyd adhesives, rubber adhesives, e.g., natural rubber, synthetic rubber, chlorinated rubber, and mixtures thereof. The pressure sensitive adhesive may be coated out of water or solvent. In some instances, it is preferred to use a rubber based pressure sensitive adhesive that is coated out of a non-polar organic solvent. Alternatively, the pressure sensitive adhesive may be a transfer tape.

Alternatively, the abrasive article may contain a hook and loop type attachment system to secure the abrasive article to the support pad. The loop fabric may be on the back side of the coated abrasive with hooks on the back up pad. Alternatively, the hooks may be on the back side of the coated abrasive with the loops on the back up pad. This hook and loop type attachment system is further described in U.S. Pat. Nos. 4,609,581; 5,254,194 and 5,505,747 and PCT WO 95/19242.

EXAMPLES

The following Test Procedure and non-limiting Examples will further illustrate the invention. All parts, percentages, ratios, and the like, in the Examples are by weight unless otherwise indicated.

RPP Test Procedure

The "RPP" procedure utilized a "Buehler Ecomet 4" variable speed grinder-polisher on which was mounted a "Buehler Ecomet 2" power head, both of which are commercially available from Buehler Industries, Ltd. of Lake Bluff, Ill. The test was performed using the following conditions: motor speed set at 500 rpm with a force 50 lbs., which is about 7.1 psi (about 50 kPa) over the surface area of the glass test blank.

A flat circular glass test blank was provided which had a 7.62 cm (3 inch) diameter and a thickness of approximately 1.0 cm, commercially available under the trade designation CORNING #9061 from Corning Glass Co. The glass material was placed into the power head of the grinder-polisher. The 12 inch aluminum platform of the grinder-polisher rotated counter clockwise while the power head, into which the glass test blank was secured, rotated clockwise at 35 rpm.

An abrasive article tested was die cut to a 20.3 cm (8.0 inch) diameter circle and was adhered with a pressure sensitive adhesive directly onto a urethane backing pad which had a Shore A hardness of about 90 durometer. The urethane backing pad was attached to a open cell, soft foam pad having a thickness of about 30 mm cut from a sheet of the soft foam. This pad assembly was placed on the aluminum platform of the grinder/polisher. Tap water was sprayed onto the abrasive article at a flow rate of approximately 3 liters/minute to provide lubrication between the surface of the abrasive article and the glass test blank.

To provide a substantially similar initial surface finish on the glass test blank (i.e., prior to polishing with the abrasive articles), each glass test blank was abraded with a metal bonded diamond abrasive article commercially available under the trade designation "3M Flexible Diamond M125" from 3M (St. Paul. Minn.). These diamond particles have an average particle size of approximately 25 micrometers.

An initial surface finish on the glass test blank was evaluated with a diamond stylus profilometer, commercially available under the trade designation SURTRONIC 3 (112/1518-822323) from Taylor Hobson (Leicester, England). An initial weight of the glass test blank was also recorded. Initial surface finishes, or Ra values, for evaluating abrasive articles according to the invention typically fell within three categories: about 1.2 $\mu$m or greater, about 0.2 $\mu$m or greater, and about 0.05 $\mu$m or greater.

The glass test blank was polished using the grinder/polisher described above. The polishing time interval of the grinder/polisher was set at 15 seconds or 10 seconds. However, real time contact between the abrasive article and the glass test blank surface was found to be greater than the set time because the grinder/polisher did not begin timing until the abrasive article was stabilized on the glass test blank surface. That is, some bouncing or skipping of the abrasive article on the glass surface was observed and the grinder/polisher began timing at the point in time when contact between the abrasive article and the glass surface was substantially constant. Thus, real time polish interval, i.e. the contact time between the abrasive article and the glass surface was about 25 seconds or less when the polishing time interval was set at 15 seconds or 10 seconds.

After polishing, final surface finish and a final weight were each recorded. The change in weight of the glass test blank over the polishing time is shown as grams of glass stock removed. The cut rate (glass stock in grams removed) and Ra values were recorded.

The following abbreviations are used throughout:

Materials Description

UAO urethane acrylate commercially available from Morton International, Inc., Chicago, Ill., under the trade designation UVITHANE 893;

HDDA 1,6-hexanediol diacrylate, commercially available from Sartomer Co., Inc., Exton, Pa., under the trade designation SR 238;

TPDA tripropyleneglycol diacrylate commercially available from Sartomer Co., Inc., Exton, Pa., under the trade designation SR 306;

PH2 2-benzyl-2-N,N-dimethylamino-1-(4-morpholinophenyl)-1-butanone photoinitiator, commercially available from Ciba Geigy Corp., Greensboro, N.C., under the trade designation IRGACURE 369;

ACH 1,1'-azobis(cyclohexanecarbonitrile), commercially available from DuPont de Nemours, Wilmington, Del., under the trade designation VAZO 88;

ASF amorphous silica filler commercially available from DeGussa GmbH, Germany, under the trade designation AEROSIL. R-972;

TFS trifluoropropylmethyl siloxane antifoamer, commercially available from Dow Corning Company, Midland, Mich., under the trade designation "7";

DIA industrial diamond particles (in various sizes), commercially available from Warren Diamond, Olyphant, Pa., under the trade designation RB; and SIC silicon carbide abrasive particles (average size 60 micrometers), commercially available from Norton Company, Worcester, Mass.

Abrasive Composite Topographies

Topography A was produced by the following procedure. A production tool was made by casting polypropylene material on a metal master tool having a casting surface comprised of a collection of adjacent truncated pyramids. The metal master tool had been made by a diamond turning process. The resulting polymeric production tool contained cavities that were in the shape of four-sided truncated pyramids. The height of each truncated pyramid was about 355 micrometers (14 mils), each base was about 1427 micrometers (1.4 mm) per side and the top was about 1350 micrometers (1.35 mm) per side. There were approximately 445 micrometers between the bases of adjacent truncated pyramids.

Topography B was produced as described above, except that the height of each truncated pyramid was about 760 micrometers, each base was about 880 micrometers per side and the top was about 640 micrometers per side. There were approximately 127 micrometers between the bases of adjacent truncated pyramids. The composites in each of these topographies are precisely shaped.

Examples 1–18

Examples 1–9 were prepared by mixing the ingredients listed in Table 1, (order of addition listed left to right), in a high shear air mixer for 30 minutes. The diamond (DIA) had an average particle size of 74 micrometers.

TABLE 1

| Ex. | UAO | HDDA | TPDA | PH2 | ACH | ASF | DIA | SIC | TFS | DIA |
|---|---|---|---|---|---|---|---|---|---|---|
| 1 | 60.70 | 7.70 | 23.00 | 1.00 | 0.50 | 2.00 | 5.00 | 0 | 0.10 | 5% |
| 2 | 55.70 | 7.70 | 23.00 | 1.00 | 0.50 | 2.00 | 10.00 | 0 | 0.10 | 10% |
| 3 | 50.70 | 7.70 | 23.00 | 1.00 | 0.50 | 2.00 | 15.00 | 0 | 0.10 | 15% |
| 4 | 45.7 | 7.70 | 23.00 | 1.00 | .050 | 2.00 | 20.00 | 0 | 0.10 | 20% |
| 5 | 35.70 | 7.70 | 23.00 | 1.00 | 0.50 | 2.00 | 30.00 | 0 | 0.10 | 30% |
| 6 | 25.70 | 7.70 | 23.00 | 1.00 | 0.50 | 2.00 | 40.00 | 0 | 0.10 | 40% |
| 7 | 55.70 | 7.70 | 23.00 | 1.00 | 0.50 | 2.00 | 5.00 | 5.00 | 0.10 | |
| 8 | 45.70 | 7.70 | 23.00 | 1.00 | 0.50 | 2.00 | 10.00 | 10.00 | 0.10 | |
| 9 | 35.70 | 7.70 | 23.00 | 1.00 | 0.50 | 2.00 | 15.00 | 15.00 | 0.10 | |

Preparation of the Abrasive Articles

The abrasive slurry, mixed above, was coated at room temperature and applied into the cavities of the production tool (Topography A) using a rubber spatula. Next, a polyester film (108 micrometers thick) having a ethylene acrylic acid (EAA) primer on the surface was brought into contact with the abrasive slurry coated production tool such that the abrasive slurry wetted the front surface of the backing having the primer. Afterwards, ultraviolet and visible light radiation was transmitted through the backing and into the abrasive slurry. Two lamps were used in series. Both lamps were an ultraviolet-visible lamp from American Ultraviolet Co., Murray Hill, N.J., that used a medium pressure mercury bulb and operated at 157.5 Watts/cm (400 Watts/inch). The speed of the curing was approximately 7.62 meters/minute (25 ft/min). Upon exposure to the ultraviolet light, the binder precursor was converted into a binder and the abrasive slurry was converted into an abrasive composite. Then, the production tool was removed from the abrasive composite/backing.

Examples 10–18 were prepared as described for Examples 1–9, except that the production tool used was Topography B.

Examples 1–18 were tested using the RPP test procedure having a polish time interval of about 25 seconds, as described above. The input Ra was approximately 1.4 to 1.5 micrometers. The results are shown in Table 2 below.

TABLE 2

| Example | Stock removed (grams) | Ra (micrometers) |
|---|---|---|
| 1 | 1.54 | 0.55 |
| 2 | 1.52 | 0.52 |
| 3 | 1.43 | 0.44 |
| 4 | 1.42 | 0.39 |
| 5 | 1.10 | 0.34 |
| 6 | 1.25 | 0.35 |

TABLE 2-continued

| Example | Stock removed (grams) | Ra (micrometers) |
|---|---|---|
| 7 | 1.33 | 0.45 |
| 8 | 1.33 | 0.47 |
| 9 | 1.19 | 0.44 |
| 10 | 1.39 | 0.60 |
| 11 | 1.35 | 0.48 |
| 12 | 1.43 | 0.53 |
| 13 | 1.32 | 0.40 |
| 14 | NA | NA |

TABLE 2-continued

| Example | Stock removed (grams) | Ra (micrometers) |
|---|---|---|
| 15 | 1.13 | 0.36 |
| 16 | 1.08 | 0.52 |
| 17 | 1.17 | 0.43 |
| 18 | 1.17 | 0.39 |

Examples 19 and 20 (Topography A) were prepared as described in Examples 1–9, except that the ingredients used are listed in Table 3, below. Examples 19 and 21 used a mix of two diamond particle sizes of about 30 μm and about 45 μm. Examples 20 and 22 used a mix of two diamond particle sizes of about 9 μm and about 15 μm. Examples 21 and 22 were prepared as described for Examples 19 and 20, except that the production tool used was Topography B.

Examples 19 and 20 were tested using glass test blanks polished with the abrasive articles of Examples 4, 7, 8, and 9. Thus, the final Ra values became the input Ra values for Examples 19–22. Examples 19 and 21 were tested using the RPP test procedure as described for Examples 1–18. These glass test blanks were than polishing using the abrasive article in Examples 20 and 22 using the RPP test procedure having a polish time interval of about 25 seconds, as described above. Thus, a polishing system was evaluated which included abrasive articles according to the invention in a polishing sequence of Examples 4, 7, 8, and 9 (average diamond particle size of about 74 μm); Example 19 (a blend of two diamond particle sizes of 10 about 30 μm and about 45 μm) and Example 20 (a blend of two diamond particle sizes of about 9 μm and about 15 μm). The initial Ra, prior to polishing with Examples 4, 7, 8, and 9 was about 1.4 μm or greater. Results are shown in Table 4.

TABLE 3

| Ex. | UAO | HDDA | TPDA | PH2 | ACH | ASF | TFS | DIA | DIA |
|---|---|---|---|---|---|---|---|---|---|
| 19/21 | 45.70 | 7.70 | 23.00 | 1.00 | 0.50 | 2.00 | 0.10 | 15.00 (30 μm) | 5.00 (45 μm) |
| 20/22 | 45.80 | 30.60 | 0 | 1.00 | 0.50 | 2.00 | 0.10 | 15.00 (9 μm) | 5.00 (15 μm) |

TABLE 4

| Example | Ra | Example | Ra | Example | Ra | Example | Ra |
|---|---|---|---|---|---|---|---|
| 4 | 0.39 | 7 | 0.45 | 8 | 0.47 | 9 | 0.44 |
| 19 | 0.06 | 19 | 0.07 | 19 | 0.08 | 19 | 0.08 |
| 20 | 0.04 | 20 | 0.03 | 20 | 0.04 | 20 | 0.04 |

The results in Table 4 demonstrated that the addition of silicon carbide particles in abrasive articles having a larger particle size did not improve the surface finish Ra value prior to polishing with the two abrasive articles having the smaller particle size. However, the overall finish was not adversely affected.

Comparative Examples A–F

Comparative Examples A–F were prepared as described for Examples 1–9, except using the ingredients listed in Table 5. For each pair of examples, (i.e., A and B, C and D, E and F), the first example used Topography A and the second example used Topography B. The silicon carbide particles (SIC) had an average particle size of 60 micrometers.

Comparative Examples A–F were tested as in Examples 1–18, described above. Two samples of each Example were run; both results are listed. The results are shown in Table 6 below. The Ra and Rtm values are the average of five measurements for each abrasive article tested.

TABLE 5

| Ex. | UAO | HDDA | TPDA | PH2 | ACH | ASF | SIC | TFS | SIC |
|---|---|---|---|---|---|---|---|---|---|
| A/B | 60.70 | 7.70 | 23.00 | 1.00 | 0.50 | 2.00 | 5.00 | 0.10 | 5% |
| C/D | 55.70 | 7.70 | 23.00 | 1.00 | 0.50 | 2.00 | 10.00 | 0.10 | 10% |
| E/F | 50.70 | 7.70 | 23.00 | 1.00 | 0.50 | 2.00 | 15.00 | 0.10 | 15% |

TABLE 6

|  | Ex A | Ex B | Ex C | Ex D | Ex E | Ex F |
|---|---|---|---|---|---|---|
| stock removed (grams) | 0.01 | 0.01 | 0.02 | 0.03 | 0.02 | 0.05 |
| Avg. Ra | 0.81 | 0.90 | 1.21 | 0.70 | 0.73 | 0.52 |
| stock removed (grams) | 0.02 | 0.05 | 0.02 | 0.03 | 0.03 | 0.05 |
| Avg. Ra | 1.17 | 0.95 | 0.69 | 0.71 | 0.74 | 0.96 |

The data shows that abrasive articles including silicon carbide particles removed less glass stock than abrasive articles according to the invention as shown in Examples 1–18 in Table 2. Furthermore, no significant polishing difference was noted between Topography A and Topography B.

Comparative Examples G–S

The following set of examples, Comparative Examples G through S, shows the capabilities of Example 20, which included 20% diamond particles having an average size of about 9 μm and about 15 μm. Comparative examples G–S are commercially available and other similar abrasive articles. These abrasive articles were tested on glass test blanks after polishing with the abrasive articles in Example 4 (average diamond particle size of about 74 μm) and Example 19 (a blend of two diamond particle sizes of about 30 μm and about 45 μm). The test procedure above was used to evaluate the abrasive articles tested except a silicone foam pad having a Shore A hardness of about 65 durometer was used in place of the urethane open cell, soft foam pad. As mentioned above, a change in the backing pad was expected to influence the polishing performance, both in grams of stock removed and surface finish as indicated by the Ra values. Additionally, the "polishing time" referred to in the tables below refers to the polish time interval actually set on the polisher/grinder apparatus. The input Ra value prior to polishing with the abrasive article in Example 4 was about 1.4 μm or greater.

TABLE 7

| Example | 4 | 19 | 20 |
|---|---|---|---|
| polishing time | 15 sec | 15 sec | 10 sec |
| stock removed (grams) | 1.2 | 0.18 | 0 |
| Ave. Ra | 0.32 | 0.07 | 0.03 |

The data shown in Table 7 demonstrated that a change in the backing pad did influence grams of stock removed from the glass test blank using the abrasive articles according to the invention which included three size ranges of abrasive particles. However, after polishing with the abrasive article of Example 20 (a blend of two diamond particle sizes of about 9 μm and about 15 μm), a substantially optically clear surface finish was achieved on the glass test blank.

For Comparative Examples G–S, polishing was tested using the RPP test procedure as described above for Examples 20 and 22. The results are shown below.

Comparative Example G was a metal bonded diamond abrasive article commercially available under the trade designation "Flexible Diamond M20 (3M 6001J)" from Minnesota Mining and Manufacturing Company, St. Paul, Minn. (herein after referred to as "3M"). The diamond particles had an average particle size of about 20 micrometers.

Comparative Example H was a metal bonded diamond abrasive article commercially available under the trade designation "3M Flexible Diamond M10 (3M 6001J)" from 3M. The diamond particles had an average particle size of about 10 micrometers. Polishing test results for Examples 4 and 19 and Comparative Examples G and H are set forth in Table 8.

TABLE 8

| Example | 4 | 19 | Comp. G | Comp. H |
| --- | --- | --- | --- | --- |
| stock removed (grams) | 0.2 | 0.02 | 1.56 | 0.79 |
| polishing time | 10 sec | 10 sec | 10 sec | 10 sec |
| Ave. Ra | 0.23 | 0.06 | 0.61 | 0.35 |

Comparative Example I was a conventional silicon carbide lapping abrasive article commercially available under the trade designation "Imperial Microfinishing Film S/C PSA (3M 468L)" from 3M. The silicon carbide particles had an average particle size of approximately 9 micrometers. Examples 4 and 19 and Comparative Example I were tested as described above. The input Ra was approximately 1.59 micrometers. Polishing test results for Example 4, Example 19, and Comparative Example I are set forth in Table 9.

TABLE 9

| Example | 4 | 19 | Comp. I |
| --- | --- | --- | --- |
| polishing time | 15 sec | 15 sec | 10 sec |
| Ave. Ra | 0.24 | 0.06 | 0.04 |

Comparative Example J was a conventional silicon carbide lapping abrasive article commercially available under the trade designation "Imperial Microfinishing Film S/C PSA (3M 468L)" from 3M. The silicon carbide particles had an average particle size of approximately 15 micrometers.

Examples 4 and 19 and Comparative Example J were tested as described above, and the results are set forth in Table 10. The input Ra was 1.42 micrometers and input Rtm was 15.35 micrometers

TABLE 10

| Example | 4 | 19 | Comp. J |
| --- | --- | --- | --- |
| stock removed (grams) | 0.78 | 0.09 | 0.04 |
| polishing time | 15 sec | 15 sec | 10 sec |
| Ave. Ra | 0.24 | 0.06 | 0.05 |
| Ave. Rtm | 8.91 | 10.25 | 9.82 |

Examples 4 and 19 and Comparative Examples I and J were tested as described above, and the results are set forth in Table 11. The input Ra was 1.50 micrometers and input Rtm was 10.56 micrometers

TABLE 11

| Example | 4 | 19 | Comp. J | Comp. I |
| --- | --- | --- | --- | --- |
| stock removed (grams) | 0.63 | 0.09 | 0.08 | 0.0 |
| polishing time | 10 sec | 10 sec | 10 sec | 10 sec |
| Ave. Ra | 0.026 | 0.06 | 0.06 | 0.04 |
| Ave. Rtm | 3.42 | 4.22 | 5.91 | 7.77 |

Comparative Example K was a conventional aluminum oxide lapping abrasive article commercially available under the trade designation "Imperial Fre-Cut Microfinishing Film PSA (3M 266L)" from 3M. The aluminum oxide particles had an average particle size of approximately 5 micrometers.

Examples 4 and 19 and Comparative Example K were tested as described above, and the results are set forth in Table 12. The input Ra was 1.54 micrometers and input Rtm was 10.38 micrometers

TABLE 12

| Example | 4 | 19 | Comp. K |
| --- | --- | --- | --- |
| stock removed (grams) | 0.95 | 0.13 | 0.0 |
| polishing time | 15 sec | 15 sec | 10 sec |
| Ave. Ra | 0.29 | 0.07 | 0.06 |
| Ave. Rtm | 2.44 | 0.90 | 0.84 |

Comparative Example L was a conventional diamond lapping abrasive article commercially available under the trade designation "Imperial Diamond Lapping Film 3 mil backing (3M 662X)" from 3M. The diamond particles had an average particle size of approximately 15 micrometers.

Comparative Example M was a conventional diamond lapping abrasive article commercially available under the trade designation "Imperial Diamond Lapping Film 3 mil backing (3M 662X)" from 3M. The diamond particles had an average particle size of approximately 9 micrometers.

Examples 4 and 19 and Comparative Examples L and M were tested as described above and the results are set forth in Table 13. The input Ra was 1.41 micrometers

TABLE 13

| Example | 4 | 19 | Comp. L | Comp. M |
| --- | --- | --- | --- | --- |
| stock removed (grams) | 0.21 | 0.02 | 0.02 | 0.01 |
| polishing time | 10 sec | 10 sec | 10 sec | 10 sec |
| Ave. Ra | 0.19 | 0.08 | 0.08 | 0.06 |

Comparative Example N was a conventional resin bonded diamond abrasive article commercially available under the trade designation "Imperial Diamond Lapping Film—Type P PSA (3M 664X)" from 3M. The diamond particles had an average particle size of approximately 9 micrometers.

Examples 4 and 19 and Comparative Example N were tested as described above and the results are set forth in Table 14. The input Ra was about 1.34 micrometers.

TABLE 14

| Example | 4 | 19 | Comp. N |
| --- | --- | --- | --- |
| stock removed (grams) | 0.44 | 0.07 | 0.02 |

TABLE 14-continued

| Example | 4 | 19 | Comp. N |
|---|---|---|---|
| polishing time | 15 sec | 15 sec | 10 sec |
| Ave. Ra | 0.23 | 0.07 | 0.06 |

Comparative Example O was a conventional beaded diamond abrasive article commercially available under the trade designation "Imperial Diamond Lapping Film—Type B PSA (3M 666X)" from 3M. The diamond particles had an average particle size of approximately 9 micrometers.

Examples 4 and 19 and Comparative Example O were tested as described above and the results are set forth in Table 15. The input Ra was 1.60 micrometers.

TABLE 15

| Example | 4 | 19 | Comp. O |
|---|---|---|---|
| stock removed (grams) | 0.68 | 0.09 | 0.04 |
| polishing time | 15 sec | 15 sec | 10 sec |
| Ave. Ra | 0.25 | 0.06 | 0.08 |

Comparative Example P was a conventional aluminum oxide lapping abrasive article commercially available under the trade designation "Imperial Fre-Cut Microfinishing Film PSA (3M 266L)" from 3M. The aluminum oxide particles had an average particle size of approximately 9 micrometers.

Examples 4 and 19 and Comparative Examples K and P were tested as described above and the results are set forth in Table 16. The input Ra was 1.72 micrometers and input Rtm was 11.62 micrometers

TABLE 16

| Example | 4 | 19 | Comp. K | Comp. P |
|---|---|---|---|---|
| stock removed (grams) | 0.55 | 0.11 | 0.01 | 0.0 |
| polishing time | 10 sec | 10 sec | 10 sec | 10 sec |
| Ave. Ra | 0.31 | 0.08 | 0.06 | 0.05 |
| Ave. Rtm | 2.86 | 0.85 | 0.64 | 0.61 |

Examples 4 and 19 and Comparative Example P were tested as described above and the results are set forth in Table 17. The input Ra was about 1.47 micrometers.

TABLE 17

| Example | 4 | 19 | Comp. P |
|---|---|---|---|
| stock removed (grams) | 0.45 | 0.07 | 0.0 |
| polishing time | 15 sec | 15 sec | 10 sec |
| Ave. Ra | 0.22 | 0.06 | 0.06 |

Comparative Example Q was prepared as described for Example 20, except that the abrasive particles used were white aluminum oxide having a 50/50 blend of average particle sizes of about 9 and about 15 micrometers.

Examples 4 and 19 and Comparative Example Q were tested as described above and the results are set forth in Table 18. The input Ra was about 1.51 micrometers.

TABLE 18

| Example | 4 | 19 | Comp. Q |
|---|---|---|---|
| stock removed (grams) | 0.28 | 0.03 | 0.01 |
| polishing time | 15 sec | 15 sec | 10 sec |
| Ave. Ra | 0.15 | 0.05 | 0.06 |

Comparative Example R was prepared as described in Example 20 except silicon carbide abrasive particles were used instead of white aluminum oxide.

Comparative Example S was an abrasive article including cerium oxide particles and was prepared as described below. The abrasive slurry included the following components:

BP1: a pentaerythritol tetraacrylate commercially available from Sartomer Co., Inc., Exton, Pa., under the trade designation "SR 295";

BP2: a 2-phenoxyethyl acrylate resin commercially available from Sartomer, Co., Inc., under the trade designation "SR 339"; CA1: a 3-methacryloxypropyltrimethoxysilane coupling agent commercially available form OSI Specialties, Inc., Danbury, Conn. under the trade designation "A-174";

PH7: 2,4,6-trimethylbenzoyl-diphenyl-phosphine oxide liquid photoinitiator commercially available from BASF, Charlotte, N.C. under the trade designation "Lucirin LR 8893";

CEO1: ceria abrasive particles having an average particle size of about 0.5 micrometer, commercially available from Rhone Poulenc, Shelton, Conn.; and APS: an anionic polyester surfactant commercially available from ICI Americas, Inc., Wilmington, Del., under the trade designation "FP4" and "PS4".

The abrasive article for Example 1 was prepared from the abrasive slurry formulation described in Table 19.

TABLE 19

| Material | weight % |
|---|---|
| BP1 | 6.85 |
| BP2 | 6.85 |
| CA1 | 0.84 |
| APS | 1.26 |
| PH7 | 0.47 |
| CEO1 | 83.74 |

This abrasive article was prepared from the cerium oxide slurry having the formulation above. The abrasive article included precisely shaped abrasive composites. The ceria particles had an average particle size of about 0.3 micrometers.

Examples 4 and 19 and Comparative Examples R and S were tested using the test procedure described above except for the polishing times noted in Table 20. The input Ra was approximately 1.46 micrometers.

TABLE 20

| Example | 4 | 19 | Comp. R | Comp. S |
|---|---|---|---|---|
| stock removed (grams) | 0.25 | 0.0 | 0.0 | 0.0 |
| polishing time | 10 sec | 10 sec | 10 sec | 10 sec |
| Ave. Ra | 0.15 | 0.07 | 0.05 | 0.06 |

The abrasive articles in Comparative Examples G–S were not as effective at producing a nearly optically clear surface finish as compared to those results achieved with the abrasive article of Example 20 above. Although the Ra values may be comparable with those achieved using the abrasive article of Example 20, it was observed that the glass test blanks polished with the abrasive articles in Comparative Examples G–S exhibited a surface finish that had an overall haze, with some surface finishes exhibiting deep scratches.

Comparative Examples T–W

The glass polishing articles of the invention, as a three part abrasive article system shown in Example 4 (abrasive particles of an average size of about 74 μm), Example 19 (abrasive particles of an average size of about 30 μm and about 45 μm), and Example 20 (abrasive particles of an average size of about 9 μm and 15 μm), was compared to a system of structured abrasive pads including aluminum oxide abrasive particles having an average size of 125 μm, 35 μm, 10 μm, and 5 μm, Comparative Examples T, U, V and W, respectively. These abrasive pads, typically used for off-hand lapping, are available from 3M (St. Paul, Minn.) under the trade designations A 125 MIC 3M 268XA AO, A 35 MIC 3M 268XA AO, A 10 MIC 3M 268XA AO, and A 5 MIC 3M 268XA AO, respectively. Results for Comparative Examples T, U, V, and W are set forth in Table 21.

TABLE 21

| Example | T | U | V | W |
|---|---|---|---|---|
| stock removed (grams) | 8.05 ± 2.26 | 0.58 ± 0.16 | 0.10 ± 0.03 | 0.01 ± 0.01 |
| polishing time | 15 sec | 15 sec | 15 sec | 10 sec |
| Ave. Ra | 1.97 | 0.43 | 0.17 | 0.08 |

It was observed that the glass test blanks polished with this system of abrasive articles in Comparative Examples T–W did not exhibit a surface finish that was a fine when compared to the results shown in Table 7, for the abrasive articles of the invention. Further, it was also observed that the surface finish generated with the abrasive articles of Comparative Examples T–W was more hazy than that generated by the abrasive articles of the invention.

The complete disclosures of all patents, patent applications, and publications are incorporated herein by reference as if individually incorporated. Various modifications and alterations of this invention will become apparent to those skilled in the art without departing from the scope and spirit of this invention, and it should be understood that this invention is not to be unduly limited to the illustrative embodiments set forth herein.

What is claimed is:

1. An abrasive article comprising:
   a backing; and
   at least one three-dimensional abrasive coating comprising diamond particles and at least one filler dispersed within a binder bonded to a surface of the backing, the binder comprising a cured binder precursor including a urethane acrylate oligomer; wherein the abrasive article is capable of reducing an initial Ra of about 1.2 μm or greater on a glass test blank to a final Ra of about 0.7 μm or less using an RPP procedure having a polish time interval of about 25 seconds.

2. The abrasive article of claim 1, wherein the at least one filler is selected from silicates or mixtures of silicates.

3. The abrasive article of claim 1, wherein the at least one filler comprises a metallic silicate.

4. The abrasive article of claim 1, wherein the at least one filler is selected from the group consisting of calcium silicate, calcium metasilicate, sodium aluminosilicate, sodium silicate, lithium silicate, and combinations thereof.

5. The abrasive article of claim 1, wherein the at least one filler is potassium silicate.

6. The abrasive article of claim 1, wherein the at least one filler is sodium silicate.

7. The abrasive article of claim 1, wherein the at least one abrasive coating comprises a plurality of precisely shaped composites.

8. The abrasive article of claim 7, wherein each of the precisely shaped composites comprise a bottom portion defining a surface area not more than about 60% greater than a top portion.

9. The abrasive article of claim 8 wherein each of the precisely shaped composites comprises a truncated pyramid having a flat top portion.

10. The abrasive article of claim 1, within the diamond particles are blended with material selected from the group consisting of fused alumina, silicon carbide, boron carbide, cubic boron nitride, ceria, garnet, silica, iron oxide, and mixtures thereof.

11. The abrasive article of claim 1, wherein the diamond particles have an average size of about 0.01 micrometers to about 300 micrometers.

12. The abrasive article of claim 1, wherein the diamond particles have an average size of about 74 micrometers.

13. The abrasive article of claim 1, wherein the binder precursor comprises an ethylenically unsaturated monomer selected from the group of monofunctional acrylate monomers, difunctional acrylate monomers, trifunctional acrylate monomers, and mixtures thereof.

14. The abrasive article of claim 1, wherein the binder precursor comprises:
   a urethane acrylate monomer in an amount of about 30 parts to about 70 parts by weight; and
   an ethylenically unsaturated monomer in an amount of about 30 parts to about 70 parts by weight.

15. The abrasive article of claim 14, wherein the binder precursor comprises:
   a urethane acrylate monomer in an amount of about 34 parts to about 65 parts by weight; and
   an ethylenically unsaturated monomer in an amount of about 46 parts to about 54 parts by weight.

16. The abrasive article of claim 15, wherein the binder precursor comprises:
   a urethane acrylate monomer in an amount of about 50 parts by weight; and
   an ethylenically unsaturated monomer in an amount of about 50 parts by weight.

17. The abrasive article of claim 1, wherein the abrasive article is capable of removing glass stock from the glass test blank in an amount of about 0.74 g or more using the RPP procedure.

18. Method of making an abrasive article comprising the steps of:
   a) forming a mixture comprising diamond particles, a binder precursor including a urethane acrylate oligomer, and at least one filler;
   b) coating the mixture onto a backing; and
   c) hardening the mixture to form an abrasive article capable of reducing an initial Ra of about 1.2 μm or greater on a glass test blank to a final Ra of about 0.7 μm or less using an RPP procedure having a polish time interval of about 25 seconds.

19. The method of claim 18, wherein the at least one filler is selected from silicates, or mixtures of silicates.

20. The method of claim 18, wherein the at least one filler is a metallic silicate.

21. The method of claim 18, wherein the at least one filler is selected from the group consisting of calcium silicate, calcium metasilicate, sodium aluminosilicate, sodium silicate, and combinations thereof.

22. The method of claim 18, wherein the at least one filler is potassium silicate.

23. The method of claim 18, wherein the at least one filler is sodium silicate.

* * * * *

UNITED STATES PATENT AND TRADEMARK OFFICE
CERTIFICATE OF CORRECTION

PATENT NO.   : 6,231,629 B1
DATED        : May 15, 2001
INVENTOR(S)  : Christianson, Todd J.

It is certified that error appears in the above-identified patent and that said Letters Patent is hereby corrected as shown below:

Column 8,
Line 27, delete "mono functional" and insert in place thereof -- monofunctional --.

Column 11,
Line 47, delete "umicrometer" and insert in place thereof -- micrometer --.

Column 21,
Line 64, delete "approximately25" and insert in place thereof -- approximately 125 --.

Column 29,
Line 56, delete "(grarns)" and insert in place thereof -- (grams) --.

Column 32,
Line 14, delete "within" and insert in place thereof -- wherein --.

Signed and Sealed this

Twentieth Day of August, 2002

Attest:

JAMES E. ROGAN
Attesting Officer           Director of the United States Patent and Trademark Office